(12) United States Patent
Solymar et al.

(10) Patent No.: US 6,244,758 B1
(45) Date of Patent: Jun. 12, 2001

(54) APPARATUS AND METHOD FOR MONITORING ELECTRONIC DEVICES VIA A GLOBAL NETWORK

(75) Inventors: Gaber Solymar, Stittsville; Peter Livingston, Pitt Meadows, both of (CA)

(73) Assignee: Absolute Software Corp., Vancouver (*) Notice: Subject to any disclaimer, the term of this patent is extended or adjusted under 35 U.S.C. 154(b) by 0 days.

(21) Appl. No.: 08/826,098

(22) Filed: Mar. 24, 1997

Related U.S. Application Data

(63) Continuation-in-part of application No. 08/558,432, filed on Nov. 15, 1995, which is a continuation-in-part of application No. 08/339,978, filed on Nov. 15, 1994, now Pat. No. 5,715,174.

(51) Int. Cl.[7] .................................................. H04B 17/00
(52) U.S. Cl. ................................ 395/200.54; 395/200.3; 395/200.57
(58) Field of Search .......................... 395/200.3, 200.31, 395/200.47, 200.49, 200.57, 200.54; 364/222.5, 286.4, 709.05; 379/37, 39, 40, 45, 56.1, 93.02, 106.01; 342/450, 451; 307/10.2; 326/8; 180/287; 116/5, 6, 75; 340/426, 506, 503, 571, 572, 568, 825.44, 825.36, 825.34, 825.54, 825.48, 825.52; 380/4, 23, 25

(56) References Cited

U.S. PATENT DOCUMENTS

| 3,925,763 | 12/1975 | Wadhwani . | |
|---|---|---|---|
| 4,999,621 | * 3/1991 | Loeb | 340/825.34 |
| 5,077,788 | 12/1991 | Cook et al. . | |
| 5,218,367 | 6/1993 | Sheffer et al. . | |
| 5,511,109 | * 4/1996 | Hartlet et al. | 379/40 |
| 5,566,339 | 10/1996 | Berholtz et al. . | |

FOREIGN PATENT DOCUMENTS

| 2036131 | 2/1991 | (CA) . |
|---|---|---|
| 0588519 | 8/1993 | (EP) . |
| 0 588 519 | 3/1994 | (EP) . |
| 96/03728 | 2/1996 | (WO) . |

* cited by examiner

Primary Examiner—Thomas R. Peeso
(74) Attorney, Agent, or Firm—Irell & Manella LLP

(57) ABSTRACT

A system for locating and monitoring electronic devices utilizing a security system that is secretly and transparently embedded within the software, firmware, or hardware of a computer. This security system initiates the client computer to periodically and conditionally call a host system to provide unique identifying indicia and location information. In one embodiment, the security system calls the host through a public switched telephone network (PSTN) and transmits the indicia in encoded form. In an alternative embodiment, which may be incorporated concurrently with the PSTN application, the security system calls the host system through the Internet and provides the host with indicia encoded within the DNS query sent. The host system is able to identify the calling computer from the indicia and is able to physically locate the computer through either caller identification or by referencing the Internet links which were used to connect the calling computer with the host system.

75 Claims, 19 Drawing Sheets

Microfiche Appendix Included
(8 Microfiche, 127 Pages)

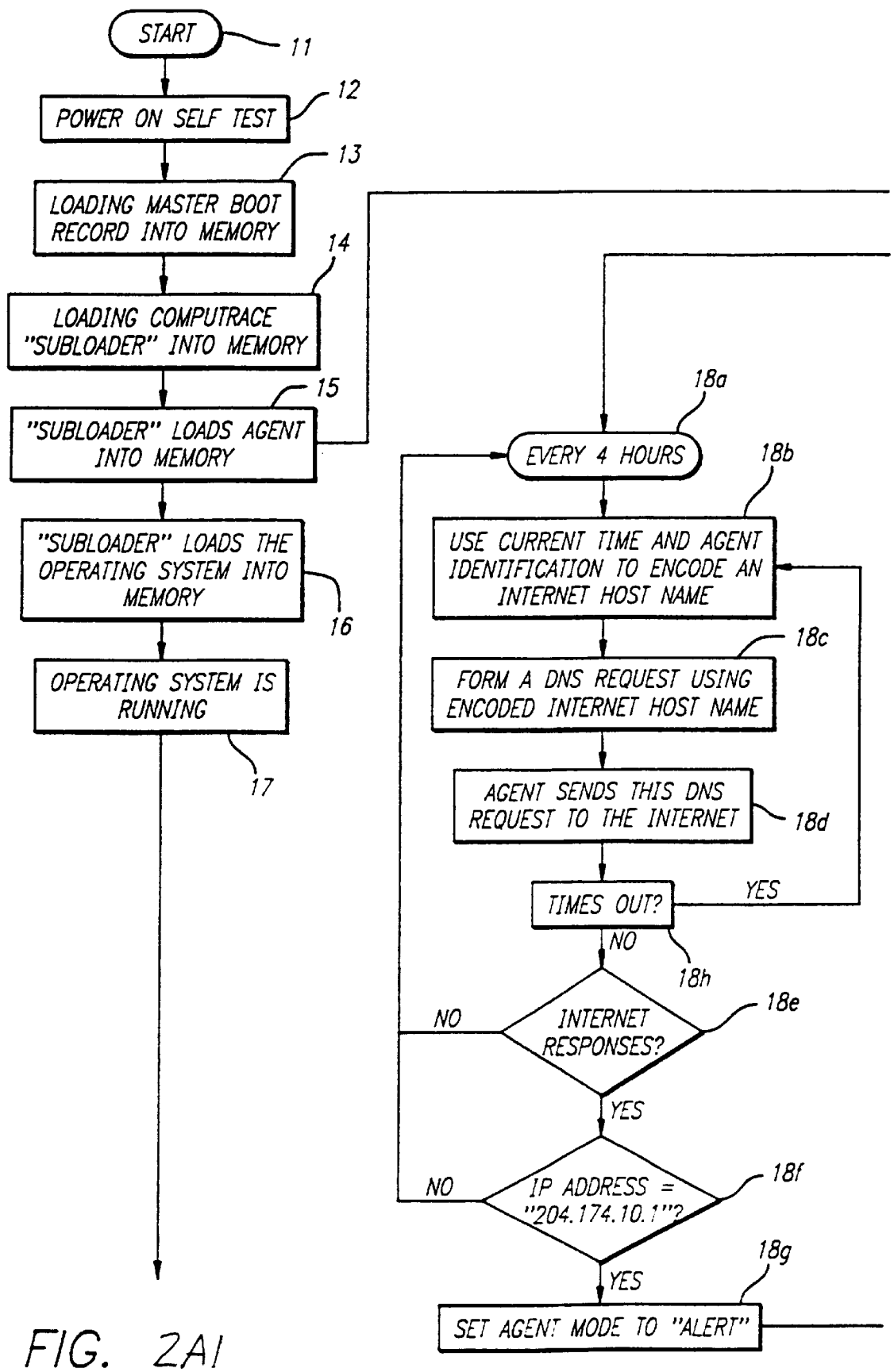
FIG. 2A1

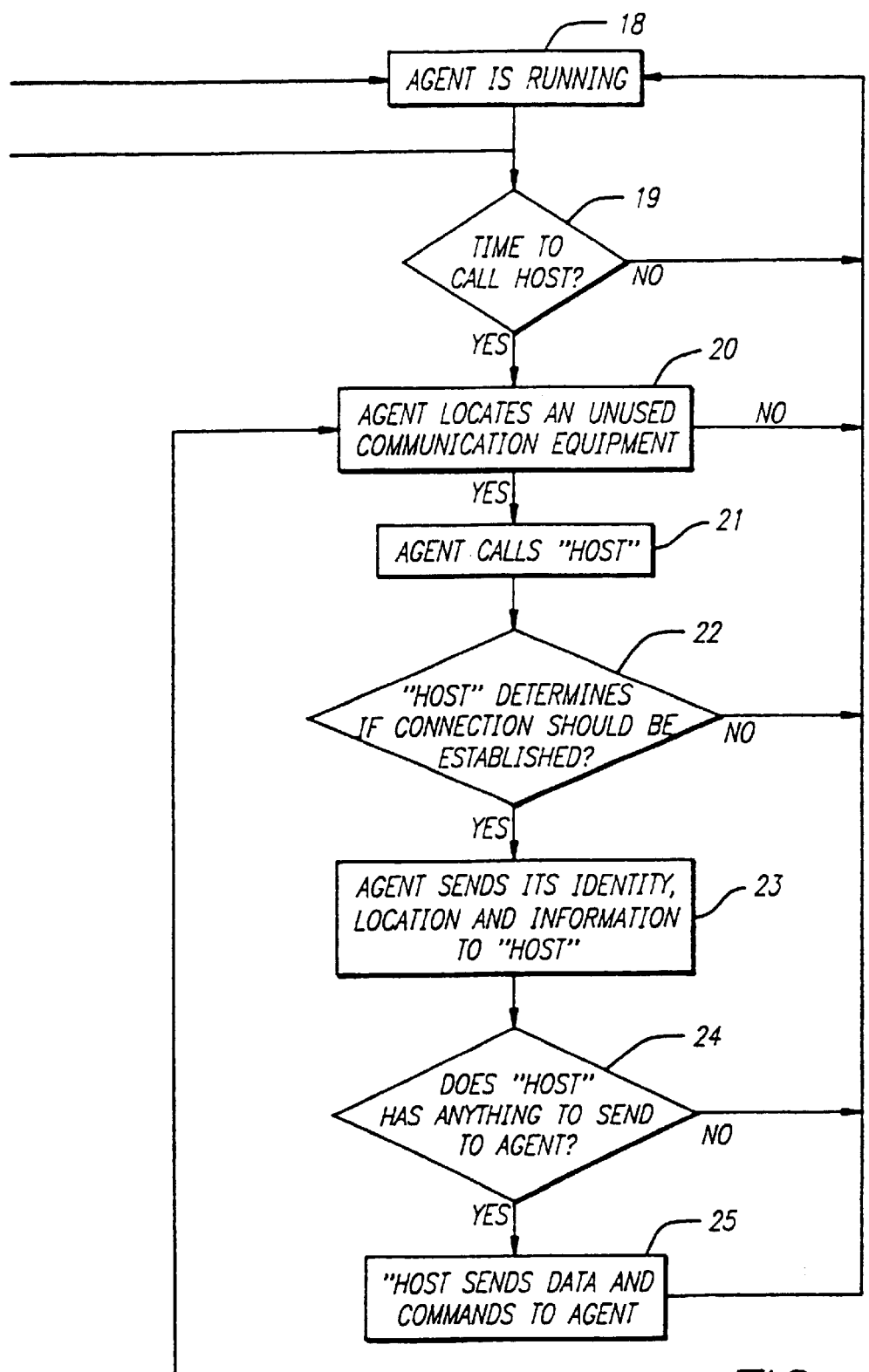
FIG. 2A2

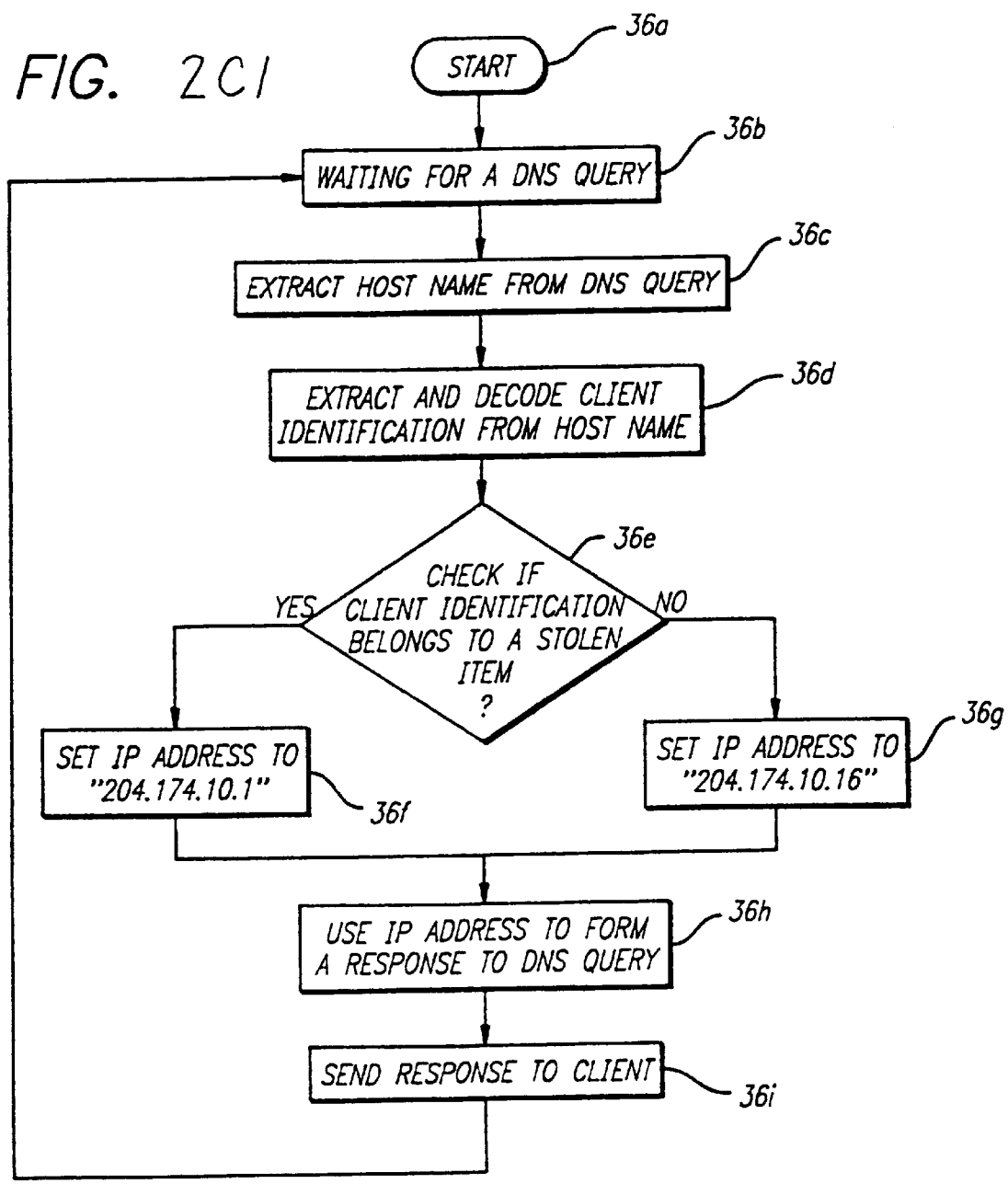

APPARATUS AND METHOD FOR MONITORING ELECTRONIC DEVICES VIA A GLOBAL NETWORK

RELATED APPLICATIONS

This Application is a Continuation-in-Part of U.S. application (Ser. No. 08/558,432) filed Nov. 15, 1995 which is a Continuation-in-Part of U.S. application Ser. No. 08/339,978) filed Nov. 15, 1994, U.S. Pat. No. 5,715,174 issued Feb. 3, 1998.

This application contains a microfiche with 8 sheets and 127 frames.

BACKGROUND OF THE INVENTION

Many electronic devices, such as laptop computers and cellular telephones, are becoming more compact and portable. While such portability is extremely convenient for the user, it has given rise to an increased risk of theft. These electronic devices are often very expensive and are easily lost or stolen.

Previously, attempts have been made to provide means for retrieving lost or stolen items of various types. The simplest approach is marking the item with the name and the address of the owner, or some other identification such as a driver's license number. If the item falls into the hands of an honest person, then the owner can be located. However, this approach may not deter a thief who can remove visible markings on the device.

Password protection schemes are of dubious value in discouraging theft or retrieving an item. Although the data can be protected from theft, the computer hardware cannot be found or retrieved. Another approach has been to place a radio transmitter on the item. This has been done in the context of automobile anti-theft devices. The police or a commercial organization monitors the applicable radio frequency to try to locate a stolen vehicle. This method is not suitable for smaller items such as cellular telephones or laptop computers. First, it is inconvenient to disassemble such devices in order to attempt to install a transmitter therein. Second, there may not be any convenient space available to affix such a transmitter. Furthermore, a rather elaborate monitoring service, including directional antennas or the like, is required to trace the source of radio transmissions.

It is therefore an object of the invention to provide an improved means for tracing or locating smaller lost or stolen objects, particularly laptop computers, cellular telephones, desktop computers and other small, portable electronic devices or expensive home and office electronic equipment. It is also an object of the invention to provide an improved means for tracing such electronic devices which can be installed without disassembly or physical alteration of the devices concerned.

It is a further object of the invention to provide an improved means for locating lost or stolen items, this means being hidden from unauthorized users in order to reduce the risk of such means being disabled by the unauthorized user.

It is a still further object of the invention to provide an improved means for locating lost or stolen items which actively resist attempts to disable the means by an unauthorized user.

It is a still further object of the invention to provide an improved means for inexpensively and reliably locating lost or stolen items.

This invention also overcomes disadvantages associated with the prior art which may interfere with the operating system or running applications. In addition, a feature whereby the security system transmits through the Internet is disclosed. This feature enables the security system to initiate a call to the host monitoring system even when the client is simultaneously running a different Internet application. This represents an advantage over the prior art including co-pending Continuation-in-Part application (Ser. No. 08/558,432), which is hereby incorporated by reference, which could not transmit while an application was using the modem since interference could alert the user to the presence of the security system. This security system operates independently of the operating system running on the electronic device.

SUMMARY OF THE INVENTION

This invention relates to a security apparatus and method for retrieving lost or stolen electronic devices such as portable computers, PCs, cablevision devices, personal digital assistants (PDAs), cellular telephones, etc. This invention enables electronic devices to be surveyed or monitored by implanting thereon an intelligent agent with a pre-defined task set. This agent communicates with a preselected host monitoring system which is capable of multiple services including; tracing location, providing identifying indicia such as an electronic serial number (ESN), and electronically notifying the end user/owner of its location. The agent hides within the software/firmware/hardware of the electronic device, and operates without interfering with the regular operation of the device. The agent is designed to evade detection and resist attempts to disable it by an unauthorized user.

The invention overcomes disadvantages associated with the prior art by yielding a security device for small computers, cellular telephones and the like which can be programmed onto the non-volatile memory (such as ROM, Flash ROM, EPROM, EEPROM or the like) of such devices. Accordingly, no physical alteration is necessary or apparent to a thief. The existence of the security device is well cloaked and thus it cannot be readily located or disabled even if the possibility of its existence is suspected. Apparatuses and methods according to the invention can be very cost effective, requiring relatively inexpensive modifications to software or hardware and operation of relatively few monitoring devices.

According to one aspect of the invention there is provided an electronic device with an integral security system. The security system includes means for sending signals to a remote station at spaced apart intervals of time. The signals include identifying indicia for the electronic device. The means for sending signals includes a telecommunications interface connectable to a telecommunications system, and means for dialing a preselected telecommunications number. In an alternative embodiment, signals are sent through a global network interface. This can be accomplished via the standard public telecommunications system which may be linked to a global network service provider, or through a private network (LAN) link to the global network. The remote station includes a telecommunications receiver having the preselected telecommunications number. The remote station and the electronic device may also simultaneously be connected through the global network.

In one embodiment of the invention the electronic device is a computer, and the means for sending signals includes means for providing signals to the telecommunication interface to dial a preselected telecommunication number and send the identifying indicia. The telecommunication interface may be a modem. The means for providing signals may include security software installed onto the non-volatile memory (such as ROM, Flash ROM, EPROM, EEPROM, or the like) of the computer.

The security system may be recorded on the boot sector of a hard disk, on a hidden system file such as IO.SYS, MSDOS.SYS, IBMBIO.COM or IBMDOS.COM, or alternatively on the ROM BIOS of the electronic device. The security system functions without interfering with the operating system or any running applications. The security system is loaded into memory whenever the electronic device is powered on or reset. It is loaded before the operating system. Consequently, this security system is operating system independent.

There is provided according to another aspect of the invention a method for tracing lost or stolen electronic devices whereby a telecommunications interface is connectable to a telecommunications system at a first telecommunications station. The method includes providing the electronic device with means for sending signals to the telecommunications interface. The means is instructed by the agent to send first signals to the telecommunications interface which then calls a remote telecommunications station. These first signals contain the encoded identification (serial number) of the sending computer. Upon detecting an incoming signal, the remote computer determines the identification of the sending computer by decoding its serial number, and can retrieve the caller phone number from the telephone company. The remote computer compares the serial number with a predefined listing of serial numbers of reported lost or stolen computers. The call will only be answered if the sending computer is on the predefined list. In an alternative embodiment, this call filtering feature can be removed and the remote computer will answer all incoming calls.

In an alternative embodiment, if the remote computer answers the incoming call then the means for sending signals automatically sends second signals to the telecommunications interface. The telecommunications interface then transmits identifying indicia for the device as well as any other pertinent information to the remote telecommunications station.

There is provided according to another aspect of the invention a method for tracing lost or stolen electronic articles through a global network such as the Internet. The client computer sends DNS queries which contain encoded identification information to a remote station through the Internet. The remote station receives the queries and decodes the encoded identification information in order to determine if the client computer matches an entry on a list of reported lost or stolen computers. If so, the host sends a predefined response to the client computer indicating that it should initiate a traceroute to provide the host with the Internet communication links connecting the client computer to the host. Additionally, when the client computer receives this predefined response from the host it immediately attempts to contact the host via the telecommunications system.

BRIEF DESCRIPTION OF THE DRAWINGS

These and other objects and advantages will become apparent by reference to the following detailed description and accompanying drawings, in which:

FIGS. 2A1 and 2A2 are an illustrative embodiment in the form of a flowchart of the process by which the operating system and agent are able to start up and run simultaneously.

FIG. 2C1 is an illustrative embodiment in the form of a flowchart of a process by which the host Internet monitoring subsystem exchanges data with an agent.

FIG. 2C2 is an illustration of a manner in which the client identification is encoded within the host name according to one aspect of the invention.

DESCRIPTION OF THE PREFERRED EMBODIMENTS

System Overview

Figure 1:
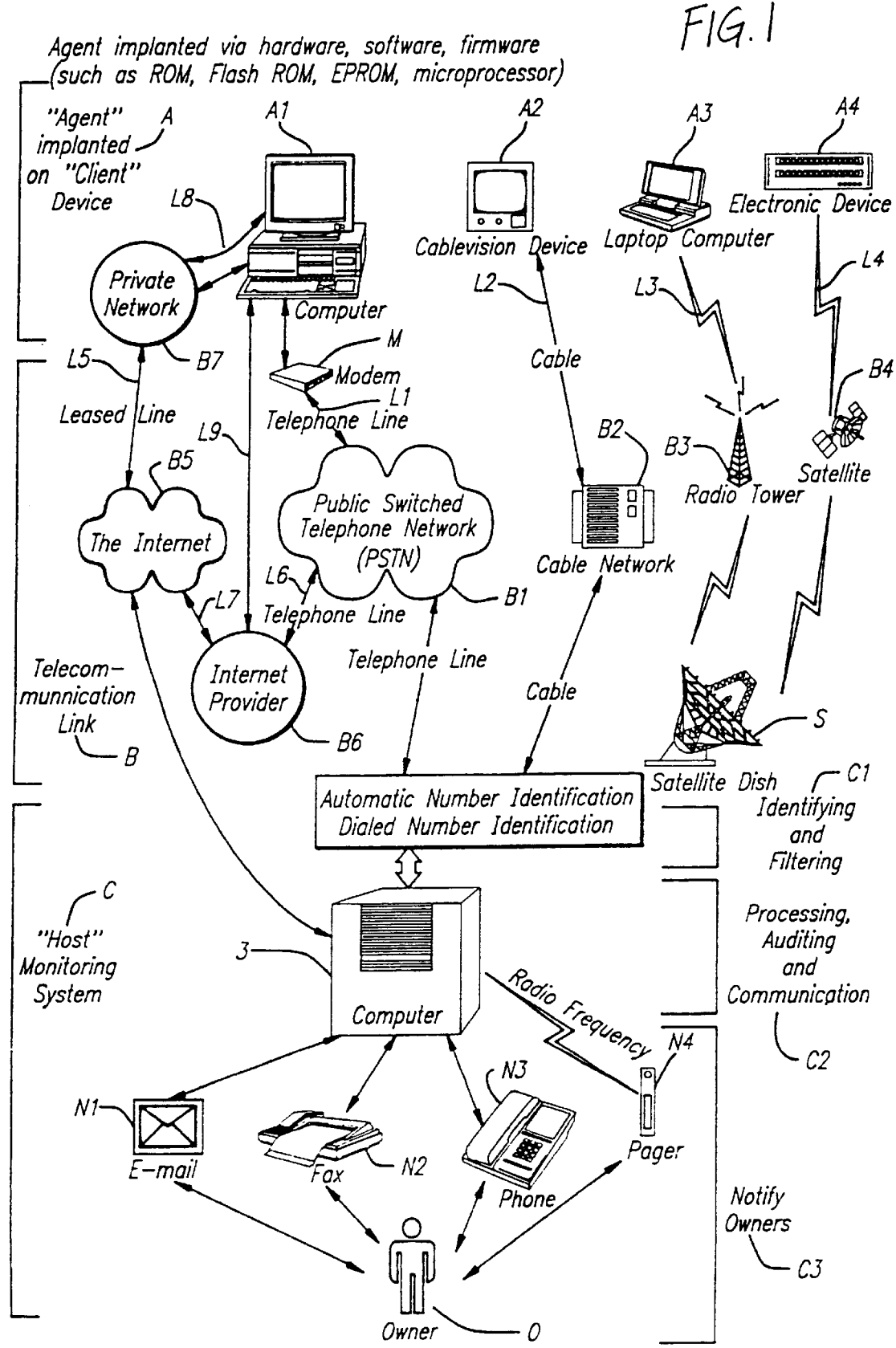
FIG. 1 is a functional block diagram of a preferred embodiment of the electronic article surveillance system in accordance with the teachings of this invention.

Referring to FIG. 1, the preferred embodiment of the electronic article surveillance system is comprised of three main components: (1) client device A consisting of any one of the electronic devices shown which have been implanted with the agent; (2) A telecommunication link B such as a switched communications system, the Internet, radio tower, satellite and cable networks; and (3) The host monitoring system C which controls the communications between the client device A and the host monitoring system C.

Referring to FIG. 1, the client device can be a cablevision device A2, laptop computer A3, or other type of electronic device A4 including a cellular telephone or personal digital assistant (PDA). However, for illustrative purposes, the client device consists of a client computer A1 attached to modem M. The host monitoring system C sends and receives data packets from the client computer A1 over a suitable bidirectional transmission medium, such as a common telephone line L1. Telephone line L1 couples the client computer A1 to the host monitoring system C and the host computer 3 through Public Switched Telephone Network B1 (telephone company). The host computer 3 notifies the appropriate parties C3 (owner O, law enforcement agency, or monitoring company) of the status of the client device A via suitable communication means such as electronic mail N1, fax N2, telephone N3 or pager N4. Host monitoring system C also identifies and can filter incoming calls C1, and provide processing, auditing and communication functions C2.

In another embodiment of the invention cablevision device A2 is connected to cablevision network B2 via cable L2. This cable L2 further connects cablevision network B2 to the host monitoring system C.

In another embodiment of the invention laptop computer A3 is connected to radio tower B3 via radio frequency (RF) transmissions L3. These RF transmissions are received by satellite dish S at the host monitoring system C.

In another embodiment of the invention electronic device A4 is connected to satellite B4 via microwave signal LA. Microwave signal L4 further connects satellite B4 to satellite dish S at the host monitoring system C.

In yet another embodiment of the invention client computer A1 is connected to private network (such as a LAN) B7 which is connected to a global network such as the Internet B5 via leased line L5. The connection between client computer A1 and private network B7 can be provided through wireless connection L8. Leased lines L5 and L7 can, according to one embodiment of the invention, transmit data to and from client computer A1 digitally. Host computer 3 is also connected to the Internet B5. In an alternative embodiment of this global network or Internet application, client computer A1 can alternatively, or simultaneously, be coupled to the Internet B5 through modem M which connects client computer A1 to telephone line L1. Telephone line L1 connects to Public Switch Telephone Network (PSTN) B1 which provides access to Internet provider B6 (such as AOL, Netcom, etc.) via telephone line L6. Internet provider B6 provides access to Internet BS via leased line L7. Alternatively, client computer A1 may be linked directly to Internet provider B6 via wireless communication link L9. Although this aspect of the invention is described in the context of the Internet, it will be understood by one of ordinary skill in the art that the application of this invention to any currently existing of future global network is contemplated herein. Further, although the Internet aspect of this invention is described and illustrated with respect to client computer A1 it should be understood that the Internet application is readily applicable to the other described devices (including laptop computers, cablevision networks, cellular telephones, personal digital assistants, and other electronic devices).

Figure 2:
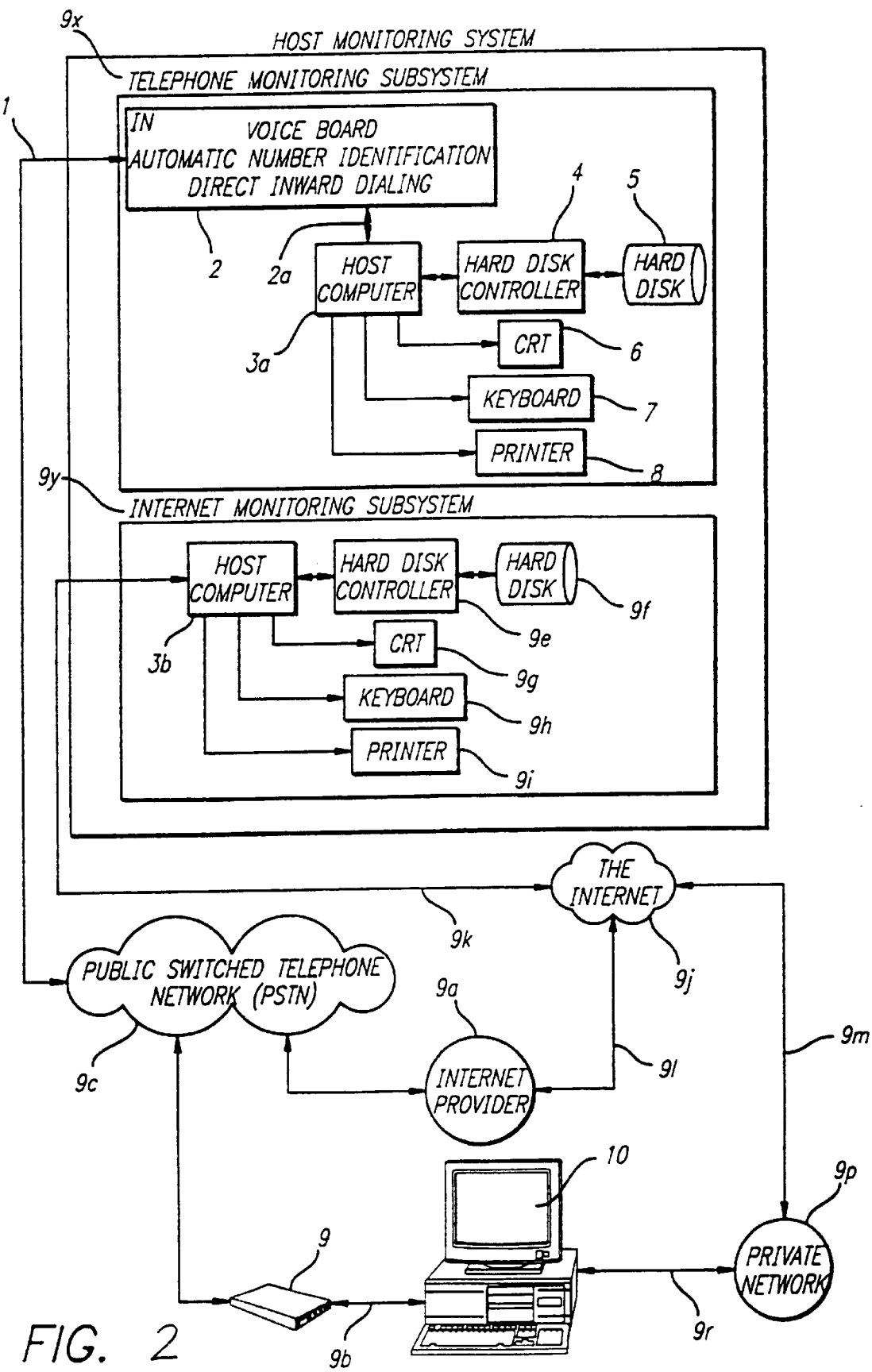
FIG. 2 is a simplified illustration of the functional block diagram of FIG. 1 for the purpose of showing an illustrative embodiment of the present invention.

Referring to FIG. 2, the host monitoring system C has two monitoring subsystems: telephone monitoring subsystem 9x; and Internet monitoring subsystem 9y. Telephone monitoring subsystem 9x monitors information transmitted via telephone line 1 from client computer 10 which has an agent installed thereon. Internet monitoring subsystem 9y monitors information transmitted via the Internet 9j from client computers 10 which have agents installed thereon.

The telephone monitoring subsystem 9x is comprised of a voice board 2, host computer 3a, hard disk controller 4, hard disk 5, CRT 6, keyboard 7, and printer 8. The host computer 3a is coupled to a suitable display device, such as CRT 6, keyboard 7, and printer 8. The keyboard 7 permits the operator to interact with the host monitoring system C. For example, the operator may use keyboard 7 to enter commands to print out a log file of the clients that have called into the system. The host computer 3a illustratively takes the form of an IBM personal computer. The source codes for the host monitoring system C, in Visual C++ by MicroSoft, are attached in the Appendix and are incorporated herein by reference.

Telephone line 1 is connected to the host computer 3a by a voice board 2 which is adapted to receive and recognize the audible tones of both caller ID and dialed numbers transmitted via the telephone line 1. Client computer 10 is connected to modem 9 via serial ports 9b. Host computer 3a is connected to voice board 2 via data bus 2a. The modem 9 and voice board 2 are connected to telephone line 1 which is routed through Public Switched Telephone Network (PSTN) 9c in accordance with a conventional telephone system. Client computer 10 and modem 9 form a first telecommunication station, while computer 3 and voice board 2 form a second, or remote telecommunications system. The host monitoring system C sends and receives data packets from client computer 10.

Ring signals are received on phone line 1 as an input to voice board 2. In an illustrative embodiment of the invention, voice board 2 may take the form of the DID/120, DTI/211 and D/12X voice boards manufactured by Dialogic Corporation. The voice board 2 is operative to recognize the ring signal. Then it receives the caller ID and dialed numbers and converts them into corresponding digital signals. As explained in greater detail below, in one embodiment of the invention, the dialed numbers provide in encoded form the unique serial number of the client computer. Host computer 3a decodes the encoded serial number for comparison against a list of reported lost and stolen computers stored in hard disk 5.

In an illustrative embodiment of the invention, the hard disk controller 4 may comprise memory control boards manufactured by Seagate Tech under the designation Hard Disk Controller. The hard disk controller 4 is particularly suitable to control the illustrative embodiment of the hard disk memory 5 manufactured by Seagate Tech under their designation ST-251.

Similarly, the Internet monitoring subsystem 9y is comprised of a host computer 3b, hard disk controller 9e, hard disk 9f, CRT 9g, keyboard 9h, and printer 9i. The host computer 3b is coupled to a suitable display device such as CRT monitor 9g, keyboard 9h, or printer 9i.

Leased line 9k connects host computer 3b to the Internet 9j. Client computer 10 is connected to modem 9 via serial port 9b. Modem 9 and host computer 3b may be connected to the Internet 9j by an Internet provider 9o which uses a communication link such as Serial Line Interface Protocol (SLIP), or Point to Point Protocol (PPP). Alternatively, or simultaneously, client computer 10 may be connected to the Internet 9j through private network (LAN) 9p having gateway to the Internet or the equivalent. In alternative embodiment, client computer 10 may be linked to Internet provider 9o and private network 9p via wireless links L9 and L8 respectively. For illustrative purposes, the communication link is a SLIP link. The Internet monitoring subsystem 9y sends and receives data packets from client computer 10 over the Internet 9j.

Domain Name Service (DNS) queries from the agent which are transmitted through the Internet 9j are received as input to the host computer 3b. Host computer 3b extracts the host name from the DNS query, and then extracts and decodes the agent identification (serial number) from this host name. Host Internet monitoring computer 3b uses the decoded agent identification for comparison against a list of reported lost and stolen computers stored in hard disk 9f. The Internet and DNS queries are discussed in more detail below.

According to one embodiment of the invention, the unique identification associated with each electronic device can be an Electronic Serial Number (ESN). These ESN codes can comprise a string of alphanumeric characters which can be encrypted and encoded. The ESN can be generated randomly by a central delegating body to assure that each electronic device has an ESN which is unique. The ESN can be permanently associated with an agent security system to enable the unique identification of the electronic device in which the agent is installed on.

The agent is a software program such a terminated stay resident program, VXD (Virtual Device driver program), application program (such as Windows service or Windows NT service), or a file filter program. The agent is installed on hardware, software, or firmware. The alternative methods of installation are described in detail in FIGS. 3A, 3B, 3C, and 3D. Once the agent is installed it will report its identity and its location to the host after specified periods of time have elapsed, and upon the occurrence of certain predetermined conditions. This is further illustrated in FIGS. 2A1 and 2A2. Client source codes are disclosed, in TASM Source Code by Borland, in the Appendix.

Once the agent is installed and running it will periodically (every four hours) report its identity and location on the Internet 9j to the Internet monitoring subsystem 9y. The agent can also concurrently report its identity and location to the telephone monitoring subsystem 9x through PSTN 9c after specified periods have elapsed, and upon the occurrence of certain pre-determined conditions. This is further illustrated in FIGS. 2A1 and 2A2.

Internet and DNS Queries

The Internet is a collection of networks linked together by IP routers and high speed digital links. Computers which have access to one of these networks can run Internet applications to send and retrieve digitally recorded files such as audio and video files. Some of the popular Internet applications are Netscape (used to surf the web), Eudora (for e-mail), Telnet (for logging on to another computer, ping (Internet utility for checking the status of a particular machine). These Internet applications can be run simultaneously. Thus, a computer can be running client programs such as Eudora and Netscape and at the same time be an FTP Server (File Transfer) for other clients that want to transfer files. The applications share the same communications links to the Internet and computer resources (cpu and memory). Thus, multiple applications can simultaneously run without interfering with each other. There is, however, a resultant diminishing effect on performance. The agent of the instant invention would have virtually no effect on the performance of other applications since it transmits such a small data packet.

Each computer linked to the Internet has a unique Internet host name/IP address. Computer networks comprising one or more of these computers are also given names to form a hierarchial naming structure. For instance, the web site for IBM is "www.ibm.com." The prefix "www" is the name of the computer (server) which is attached to the ibm.com network. Addresses could be coded using numbers, but this would make administration of the Internet extremely difficult. Instead, a method providing for the mapping of Internet host names to network addresses was implemented. This mapping system is the Domain Name System (DNS). It is a distributed, hierarchical administrative system. At the top of the hierarchy is the root domain containing the top level domains (com, edu, net, ca, us, etc.). At the bottom end is a domain name such as cs.berkeley.edu. which corresponds to the computer science department of the University of California at Berkeley. Each domain has more than one authoritative server which can map its Internet host name to its IP (numerical) address.

If a user wants to access the site at www.psmith.cs.berkeley.edu from the address pliving.absolute.com, the user would first input www.psmith.cs.berkeley.edu. into his web browser. The web browser would then send a DNS query to the absolute.com authoritative server to determine if the desired address had been recently resolved (DNS resolutions are cached to enhance the performance of the DNS system). If the absolute.com DNS server cannot resolve this address, then the next DNS server up the chain is checked (the DNS server at the "com" level). If that higher level server also cannot resolve the address, then the root server directs the process down the chain to the top level "edu" DNS server. If the "edu" DNS server cannot resolve the address, then the DNS server at berkeley.edu is contacted. Ultimately, a DNS server is found that can determine the appropriate IP address based on the Internet host name. The IP address is provided to the web browser to enable communication with www.psmith.cs.berkeley.edu.

Once the desired IP address has been determined, packets of data can be sent across the Internet through IP routers. These IP routers can read the numerical addresses and determine where to send each packet. Each IP router has a unique IP address. Typically, several IP routers need to be contacted to link a user with his desired Internet site. As explained in more detail below, the traceroute routine provides a listing of all IP routers used to enable communication between a client and host.

Functions of the Agent

One of the important functions of the agent is to contact the host monitoring system C to report the identity, location, and other information relating to its associated client computer 10. The agent has to determine the appropriate time for it to call the host monitoring system C. The agent can contact the host monitoring system C through the PSTN 9c connecting to the telephone monitoring subsystem 9x, or through the Internet 9j which connects the Internet monitoring subsystem 9y. Thus, the agent can communicate with a host monitoring system C using either the Internet or the PSTN techniques. Alternatively, the agent may rely concurrently on both techniques.

FIGS. 2A1 and 2A2 together show a flow chart of the agent work cycle. This work cycle describes the method by which the agent is loaded when the client computer 10 is initially turned on, and the manner in which the operating system and the agent run concurrently. Once the client computer 10 is powered on 11, it performs a power on self-test (POST) 12. The POST tests the system hardware, initializes some of the devices for operation, and loads the master boot record (MBR) 13. Since the MBR was installed with an agent subloader, the subloader is loaded into memory 14 and executed. The subloader's first task is to load the agent into memory 15. Then the subloader loads the operating system (OS) into memory 16 and returns control to the operating system. Now both the operating system 17 and the agent 18 are running simultaneously.

In the PSTN application, once the agent is running 18, it will determine the appropriate time to call the host 19. The time period in which the agent is waiting for the appropriate time to call the host is the "active" period. The agent will only call the host when a pre-defined time period has elapsed, or when a pre-determined event has occurred which triggers the client to contact the host. Every one-eighteenth of second the agent compares the current date and time with the date and time that the agent is due to call the host. If the agent determines that it is time to call the host it will transfer to "alert" mode.

In alert mode the agent will attempt to call the host eighteen times per second until it is successful. Once in alert mode, the agent does a thorough search within the computer to find free (not currently being used by any running application) communication equipment 20. In an illustrative embodiment, the communication equipment comprises a modem 9. It is contemplated herein that different communication mechanisms (i.e., modem, satellite link, RF link, etc.) can be provided at several of the communication ports. In such a scenario, the agent would poll the communication ports (corresponding to the different communication mechanisms) to find free communication equipment. If the agent fails to find any free equipment, then the agent will abort its attempt to call the host and repeat the cycle 18 within one-eighteenth of a second. However if the agent locates free communication equipment, it will call the host 21. Upon receiving a call from the client computer 10, the host examines the agent identity, which according to the preferred embodiment is the serial number of the client computer, and determines if a connection should be established 22. The host establishes a connection when the serial number of the computer contacting the host matches an entry on a list of reported lost or stolen computers. In an alternative embodiment, this call filtering feature is eliminated and the host system establishes a connection whenever there is an incoming call. The list of reported lost or stolen computers is maintained within the host monitoring system C. If the host does not accept the call then the agent will not call back until the next appropriate time (after predetermined time period has elapsed) 18. If the host accepts the call, then the agent will send the host its encoded identity (such as its ESN), location (caller ID) and any other pertinent information such as local date and time 23. The agent then checks if the host has any data or commands for the client 24. If the host has no data or commands to be sent, then the agent will terminate the call and repeat the cycle 18. Otherwise, the host will send the data or commands 25 before it terminates the call, and returns to "active" mode 18. This work cycle is described in much greater detail below with reference to FIGS. 3E, 3F, and 3G.

In the Internet application, which can run alone or concurrently with the PSTN application, the agent initiates a call to the host at relatively short predetermined intervals. According to the preferred embodiment, in its "active" mode the agent calls the host every four hours 18a. The agent uses the current time and the unique agent identification to encode an Internet host name 18b. The agent then forms a DNS request using the encoded Internet host name 18c. The agent sends this DNS request to the host through the Internet 18d. If the agent's attempt to send the DNS request to the Internet times out 18h after a predetermined time period has elapsed, the agent will sleep for one minute and then repeat the cycle from step 18b. If the call fails due to another error (such as the absence of winsock facilities which enable communication with the Internet, and/or the failure of the computer to be configured for TCP/IP communication) 18e then the agent will repeat the cycle four hours later 18a. In this way, the agent inherently checks for the existence of an Internet connection.

After sending its DNS request, the agent waits for a response. Upon receiving a valid response from the host 18e, the IP address is extracted from the response and compared against a reference IP address 18f. In this illustrative embodiment of the invention the reference IP address is "204.174.10.1". If the IP address equals "204.174.10.1" then the agent's mode is changed from "active" to "alert" on the Internet side 18g. The host will send this reference IP address only when it has determined that the agent identification matches one of the entries on a list of reported lost or stolen computers stored at the host. If the IP address extracted from the host response does not equal "204.174.10.1" then the agent remains in active mode and does not call the host for another four hours.

As will be explained in more detail below, when the agent goes into "alert" mode in the Internet application, the agent initiates a traceroute routine which provides the host with the Internet communication links that were used to connect the client computer to the host. These Internet communication links will assist the host system in tracking the client computer. The IP address of the source of the DNS query is sent to the host within the DNS query. However, if the source of the query is transmitted through a "proxy" server, then the IP address of the client computer (which may not be unique since it may not have been assigned by the InterNIC) will likely be insufficient to track the location of the client computer. In such a scenario, it is necessary to determine the addresses of other IP routers which were accessed to enable communication between the client and the host. These addresses and the times that they were accessed are compared with internal logs of the proxy server which record its clients' Internet access history. In this way, the client can be uniquely identified and located. Additionally, the transfer of the Internet application into "alert" mode is a condition which triggers the transfer of the PSTN application to "alert" mode.

The system remains transparent to an unauthorized user via implementation of well known deflection methods. Attempts to read or write to the location where the agent has been installed are deflected in order to prevent discovery of the agent. When read attempts are made to the agent location the system generates meaningless bytes of data to be returned to the user. When write attempts are made to the location where the agent is installed, the client computer accepts the input data and informs the user that the write has been successful. However, the data is not really stored, and thus the agent is preserved. In the Appendix, the source code for the disk deflection routines are disclosed within file SNTLI13V.ASM. The agent, in order to remain hidden to the user, will not interfere with any running applications unless designed to interfere.

Detailed Operation of Agent Work Cycle

Figure 3:
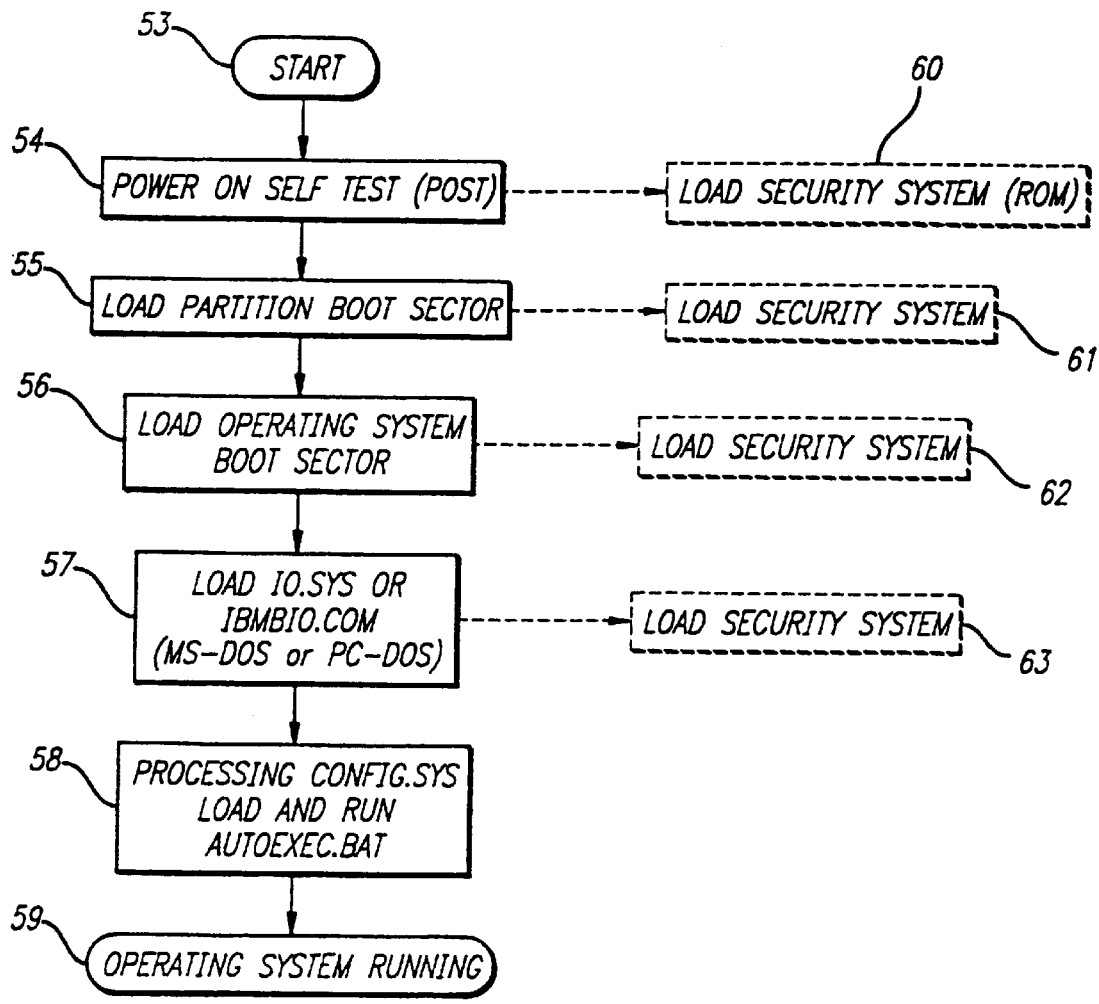
FIG. 3 is an illustrative embodiment in the form of a flowchart showing the conventional method of booting up a personal computer with alternative loading points for the agent security system shown in broken lines.
Figure 3A:
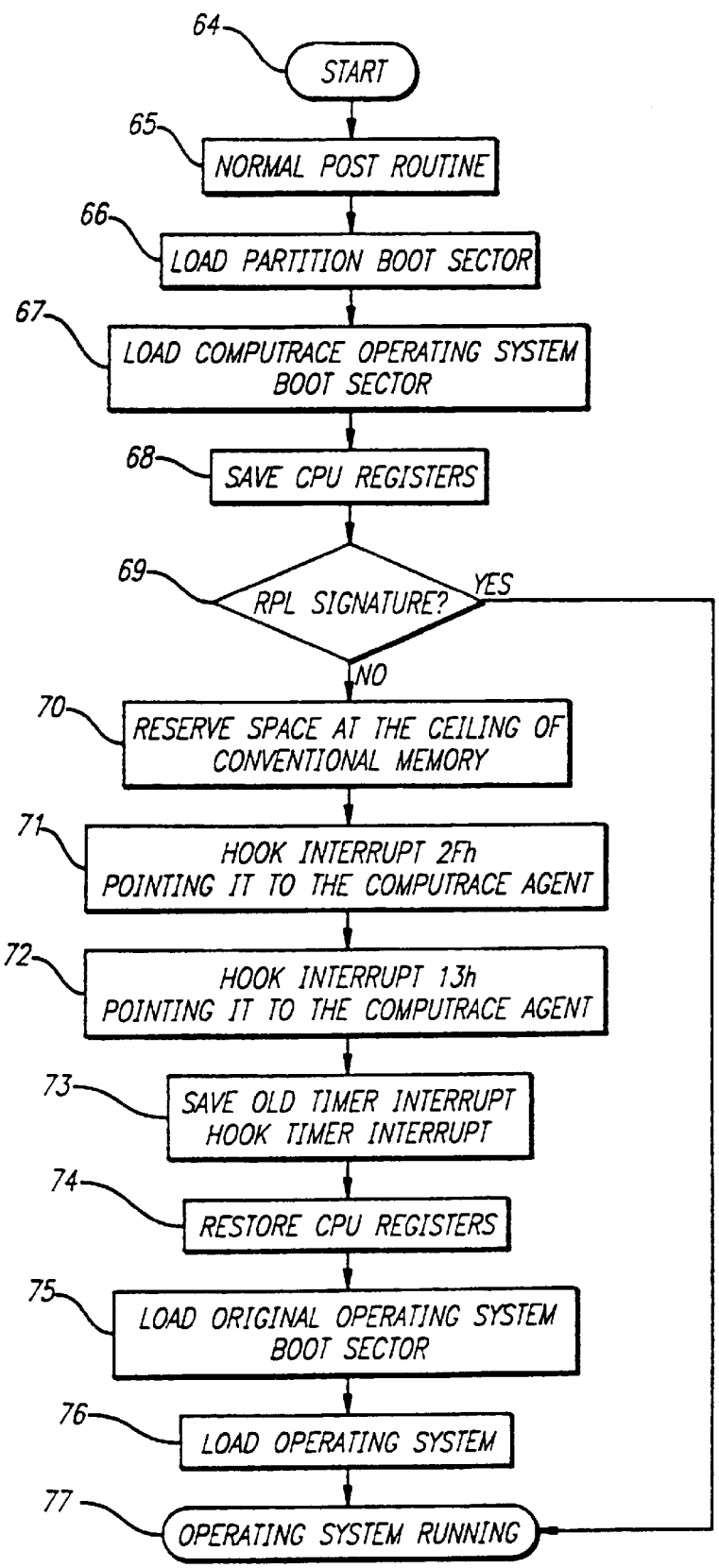
FIG. 3A is an illustrative embodiment in the form of a flowchart showing a method for startup loading of an agent security system according to an embodiment of the invention wherein the operating system boot sector is loaded with the agent.
Figure 3B:
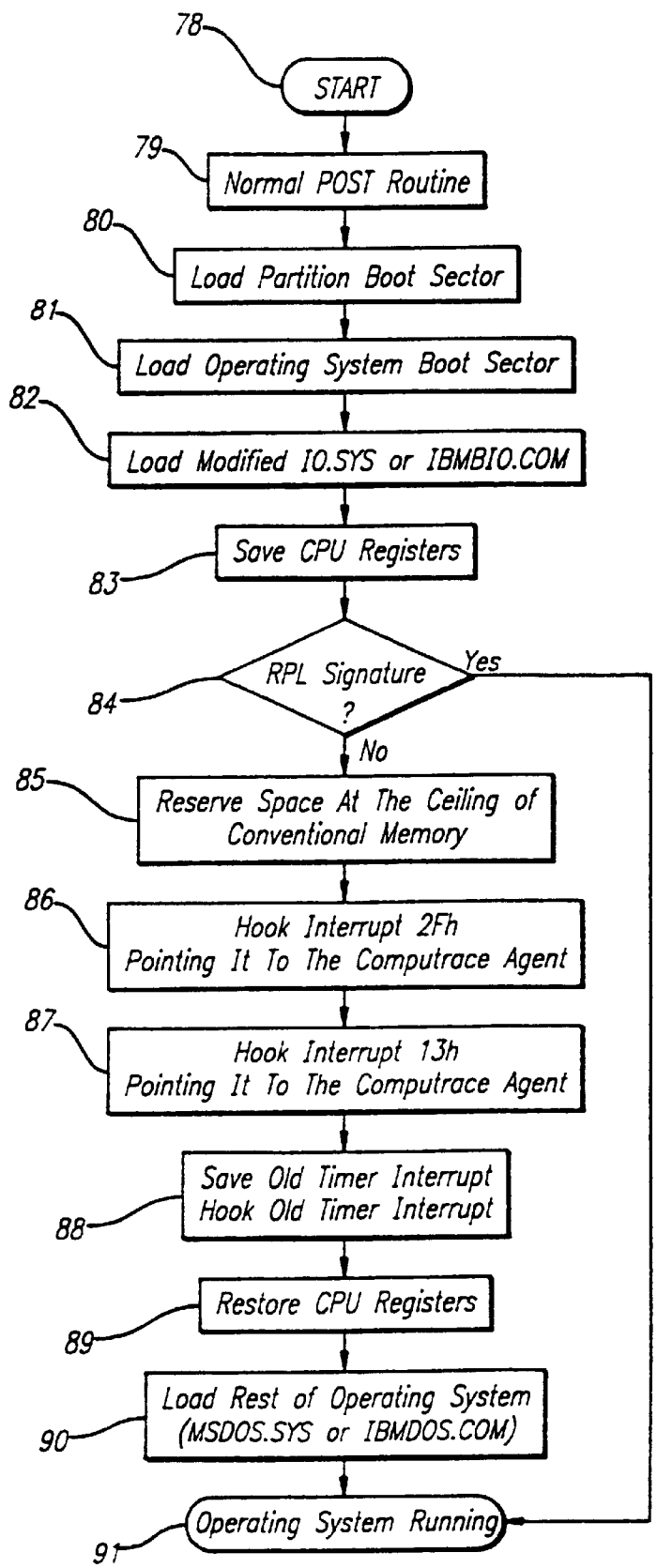
FIG. 3B is an illustrative embodiment in the form of a flowchart wherein the hidden system file IO.SYS or IBMBIO.COM is modified to be loaded with the agent.
Figure 3C:
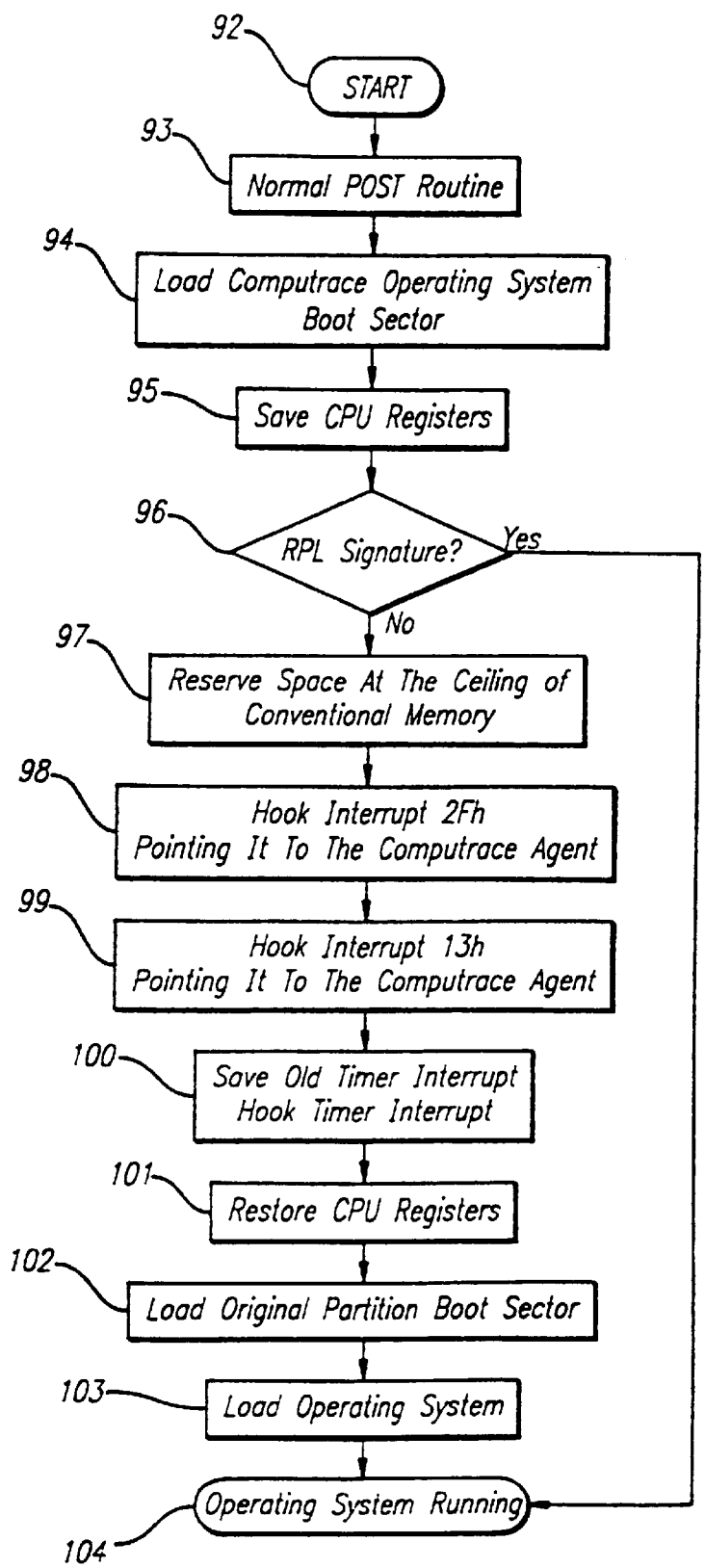
FIG. 3C is an illustrative embodiment in the form of a flowchart wherein the partition boot sector is modified to be loaded with the agent.
Figure 3D:
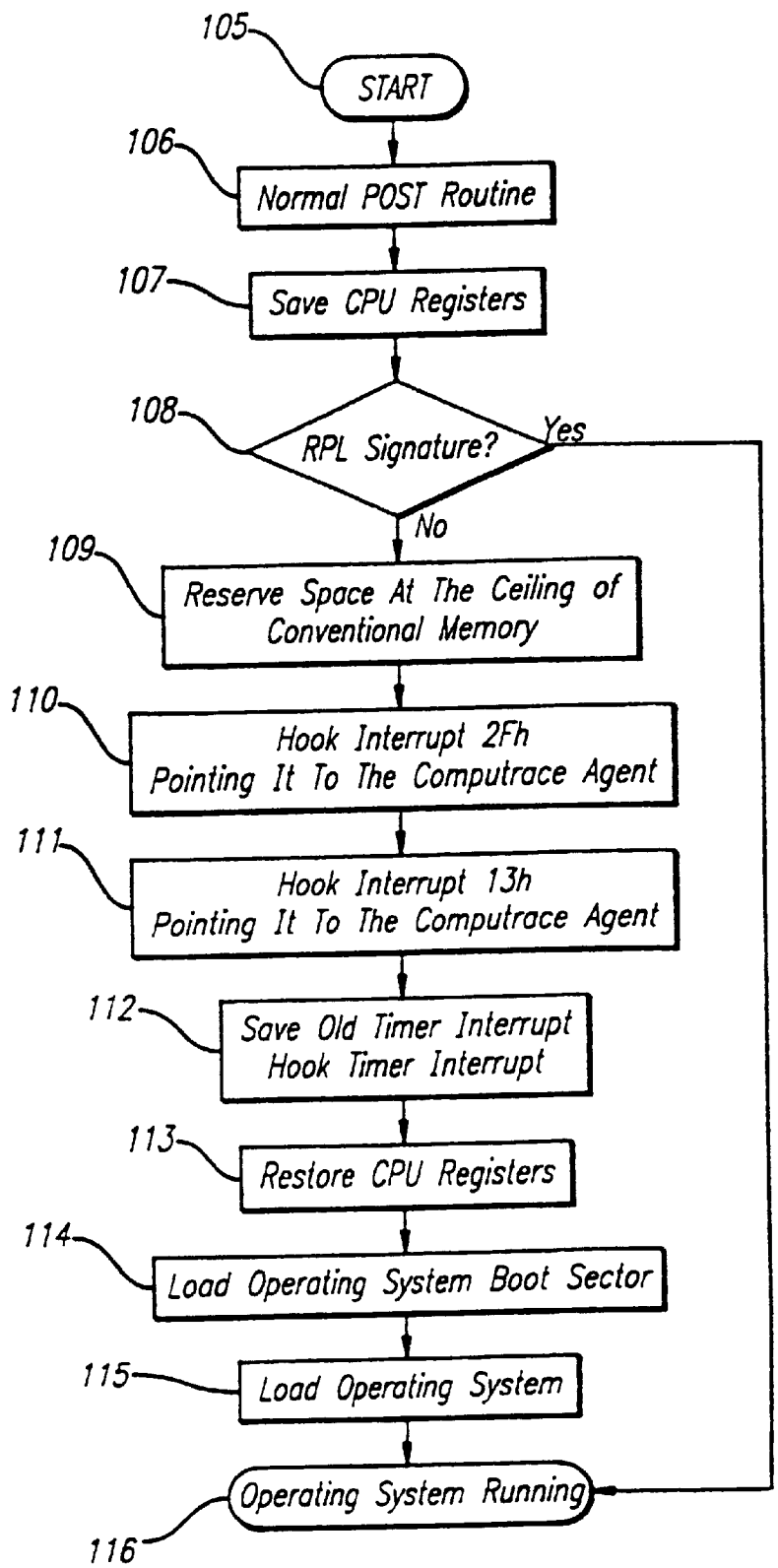
FIG. 3D is an illustrative embodiment in the form of a flowchart wherein the agent security system is ROM BIOS based.
Figure 3E:
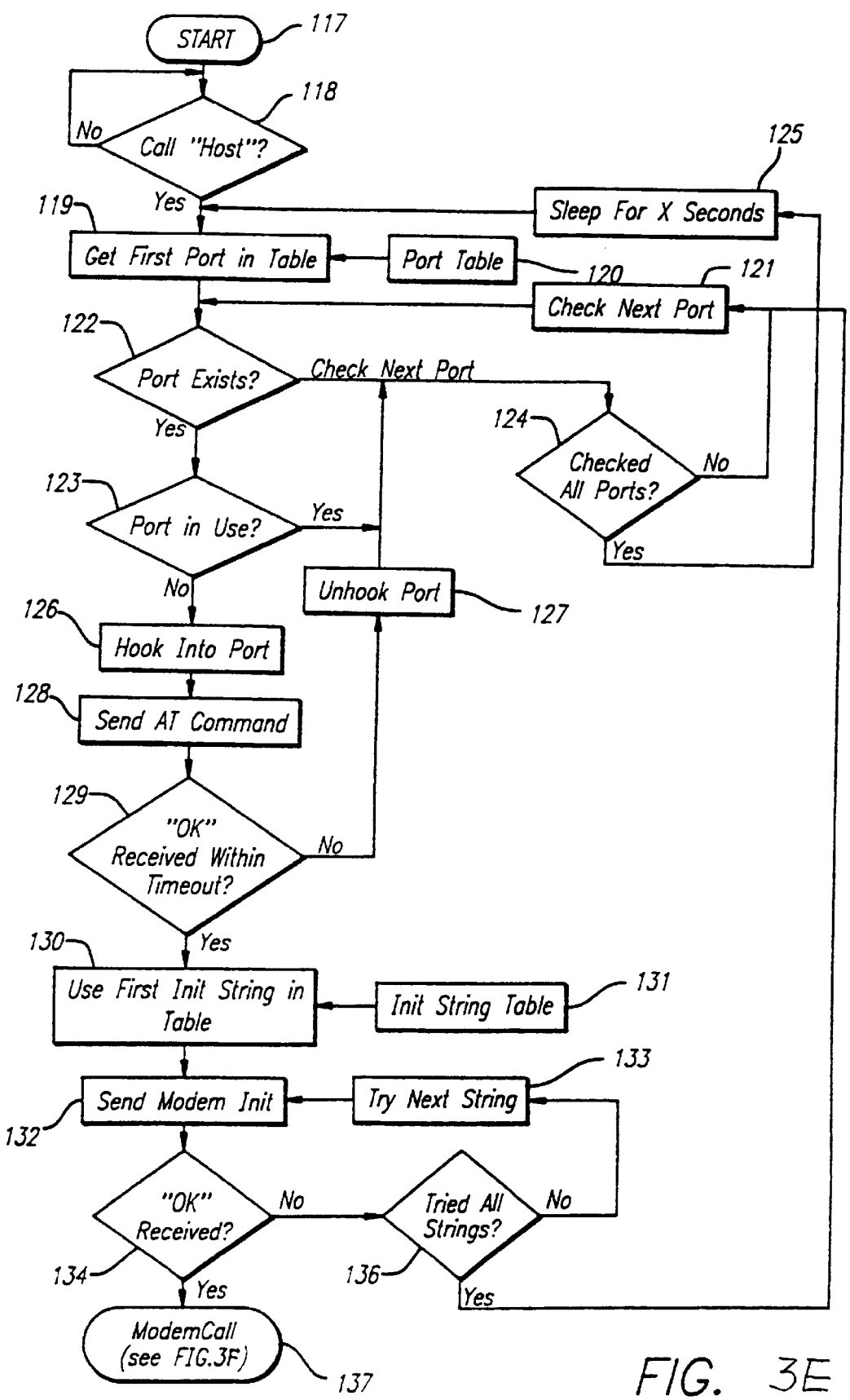
FIGS. 3E and 3F are portions of an illustrative embodiment in the form of a flowchart showing the agents' work cycle according to an embodiment of the invention.
Figure 3F:
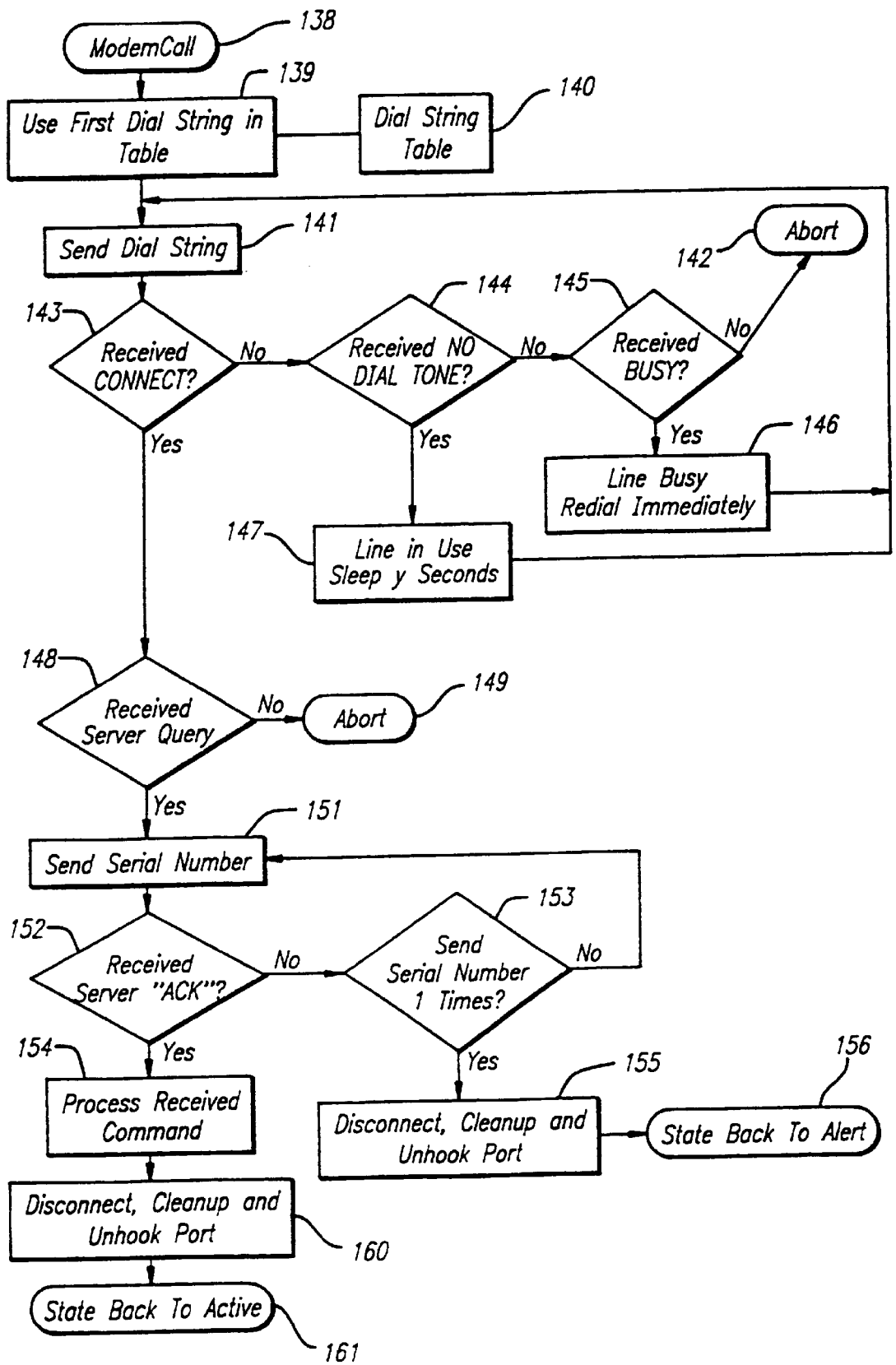
Figure 3G:
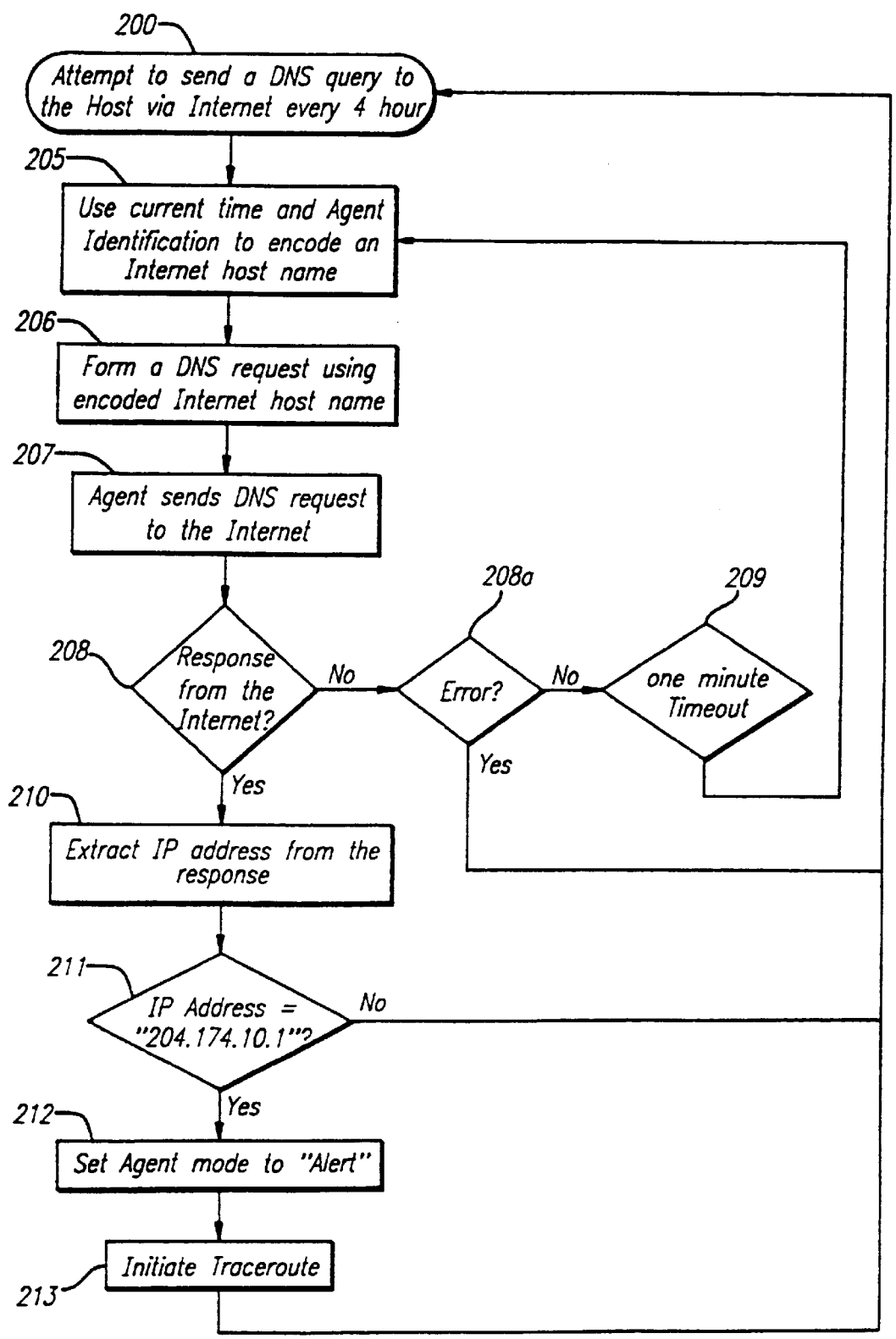
FIG. 3G is a portion of an illustrative embodiment in the form of a flowchart showing the agents' work cycle for the Internet application.

Referring to FIG. 3G, a flow chart is provided which describes in detail the background process operations relating to the Internet application. The background process wakes up every four hours 200. It uses the current date and time together with the agent identification (serial number) to encode an Internet host name 205. This encoded host name is used in forming a DNS query 206 to be sent to the host Internet monitoring subsystem 9y. After sending this DNS query to the host Internet monitoring subsystem 9*y* through the Internet 207, the agent waits for a response 208. If an error is found 208*a* due to a missing DLL or poor TCP/IP configuration, or an error other than a timeout, then the agent will wait four hours and repeat the cycle 200. If no response is received after a predetermined time period has elapsed, the agent will sleep for one minute 209 and then send another DNS query 205. Upon receiving a valid response from the host Internet monitoring subsystem 9*y*, the Internet Protocol (IP) address is extracted 210. If this IP address equals "204.174.10.1" 211 then the background process sets the agent's mode to alert 212. If the IP address does not equal "204.174.10.1" 211, then the agent remains in active mode and does not attempt to send another DNS query to the host for four hours 200.

Once the agent is in alert mode it initiates a traceroute 213 to provide the host with the Internet communication links which connect the client computer to the host. The transfer of the Internet application to alert mode also triggers the transfer of the PSTN application to alert mode. Once the PSTN is in alert mode, the agent attempts to call the host telephone monitoring subsystem 9*x* to report its status (identification, location, and other information) through the PSTN eighteen times per second until it is successful.

The following is a discussions of how the traceroute routine operates within the Internet to provide the Internet links which connect the client computer to the host. The Internet is a collection of local area networks joined by IP routers. These IP routers read the numerical destination address of the IP packet sent by each computer linked to the Internet and decrease the Time to Live (TTL) field (used to age a packet) of the packet before sending it to the next appropriate router. However, if the TTL field is zero, the router will return the packet to the source computer with a fail error code.

A traceroute is performed by doing multiple pings from the computer 10 to the host Internet monitoring subsystem 9*y*. The TTL field is incremented from one for each ping. The first ping is sent with a TTL value of one. It will fail at the first router and the first router address will be determined since the IP packet which will indicate the address of the first router will be returned to the source (client) computer. The second ping will then be sent with a TTL value of two. If this call fails then the second router address will be determined. This process is continued until the ping succeeds. By saving each router address, a trail of routers linking the client computer with host Internet monitoring subsystem 9*y* is created. This route, representing the sequence of Internet communication links between the computer and the host, is then transmitted to the host Internet monitoring subsystem 9*y* which saves this information on disk. This information can be used to help track the computer.

First, the "owner" of the source IP address (corresponding to a certain router (LAN) used) will be determined. This is accomplished by presenting the linking information (complete linking information between the client computer and the host is provided pursuant to the traceroute) to the appropriate Internet governing body, such as InterNIC, which is responsible for delegating IP addresses. According to the preferred embodiment, this query can be performed by sending a telnet command to the InterNIC including the address that needs to be queried.

Once the owner of an IP address is determined by querying the InterNIC, the retrieval process can continue. The owner, which may be an independent service provider (such as AOL, Netcom, etc.), is contacted and the date/stamps saved by the Internet monitoring subsystem 9*y* are compared with the ISP's server logs which are used for billing. These logs generally contain extensive details relating to the owner, time, and date that a particular IP address was used. These logs may be stored in TACACS or RADIUS databases which are created from Cisco or Livingston terminals respectively. Thus, the location from which the client computer called the host through the Internet may be determined.

Referring to FIGS. 3E and 3F, the following is a detailed description of the agent work cycle with respect to the PSTN application. Once the system is powered on 117 a timer interrupt will occur 18.2 times per second. Every eighteen timer interrupts, the complementary metal-oxide semiconductor (CMOS) real-time clock will be accessed, and the time and date will be stored for comparison with the previous real-time clock access. If the date and/or time changes towards the future, no action will be taken to track the time displacement. In this way the agent determines whether it is time to call the host 118. Thus if the current date has advanced far enough into the future (past the date and time to call the host), the agent security system will change its mode of operation from active to alert whereby calls will be regularly attempted (eighteen times per second) until a call is made and a transaction with the host server has been completed. If the system time has been backdated, a modal change from active to alert will occur. This feature safeguards against a thief disabling the agent by backdating the client so that the agent does not call the host for a long period of time.

The communications ports are checked 119–125 (via a port address table 120) to see if they exist. If the first one encountered is not in use 123, it will be dynamically hooked 126 into by swapping the appropriate interrupt handler and unmasking the appropriate interrupt request line. If an error occurs, or if a port is in use, the next port will be checked 124 until either a valid port is found or the port address table has been exhausted 125. If the port address table is exhausted then the agent waits X seconds before trying to find an unused port again. Appropriate cleanup routines restore "swapped" ports to their initial settings.

If the communications port responds properly and a port is actually hooked into 126, the system will attempt to connect to a modem via issue of the Hayes compatible AT command 128. If the modem does not exist, that port is unhooked 127, and the next port is checked 124. If the modem does exist and if it responds with an "OK" 129 to the AT command, the system will attempt to initialize the modem by sending it a modem initialization string 130, 132 (from a table of initialization strings 131). If the modem does not respond with an "OK" 134, this indicates that the initialization attempt failed and the next string in the table is tried 136. This process continues until a valid initialization string is found 134, or the modem initialization string table is exhausted 136 (at which point, the routine will delay for some seconds then try again from the start by checking for the next available port 121).

Once a valid and available communications port has been found, and it has been verified that a functional modem is associated with that port, the system will attempt to dial out to the remote host server 137, 138.

Referring to FIG. 3F, a dial string table 140 is used 139 to attempt the call since a PBX or switchboard may need to be exited using a dialing prefix. The dial string is sent 141, and if successful, the CONNECT result code (numeric or letters) from the remote host server will be received by the client 143. The host will send a signal ("Query") to the client requesting its serial number. If the client does not receive the query signal 148 it will abort 149 and repeat the cycle 117. If the client receives the "Query" signal, then the serial number is sent to the host 151. At this point, telecommunications have been established and the client-server transaction begins. If the transaction succeeds, the resultant state will be "active", otherwise the state of the PSTN application will still be in "alert" mode. If, for some reason, a "NO DIALTONE" event happens 144, a delay will occur 147 and the next dial string 141 will be attempted again. If the line is "BUSY" 145, then a redial attempt 146 will occur using the same dial string for a predefined number of attempts or until a telecommunications connection is made, whichever occurs first. If there is no connection made pursuant to the sending of the dial string and if no dial tone or busy signal is received, then the call attempt is aborted 142.

The client to remote host server transaction involves the sending of the computer serial number 151 via the telephone company or carrier service. The "Caller ID" is implicitly received by the remote server (typically during the initial telecommunications event known as "RING"). Upon the telecommunications event called "CONNECT", the remote host server sends the agent security system client a vendor specific message called "QUERY" 148 which in effect tells the client to send the serial number. This step is particularly significant in an alternative embodiment of the invention wherein the serial number is not sent via the dialed numbers. The step of sending this serial number 151 requires the server to acknowledge that it has received 152 and processed 154 the serial number (validating it). If the appropriate acknowledgment is not received, the client computer will attempt to send its serial number a predefined number of times 153 before it gives up (whereby it disconnects, cleans up, unhooks port 127, 155 and returns to "alert" mode 156). Once the server has acknowledged that it has received and processed the serial number and any other information sent by the client, the modem disconnects 160. Any other cleanup necessary (such as changing the date of the last call to the present) will also be done here 160. Finally, the resultant state will be reset to active 161.

If the serial number of the computer that called in does not match with any of the reported lost or stolen computers, no further action will be taken. If, however, the serial number transmitted to the remote host server matches one of the serial numbers on a current list of lost or stolen computers, further processing will occur to facilitate the recovery of the missing equipment. Such processing includes, but is not limited to, automatically or manually placing a call to the local authorities in the vicinity of the missing equipment, or the owner of such equipment.

Installing and Loading the agent

The agent is installed during a typical boot up sequence to the operating system of a computer. FIG. 3 shows a boot-up process for a typical personal computer. The details of the boot up process are discussed in a subsequent section entitled "Conventional Boot Up Methods". It should be understood that this invention is applicable to other types of computers and electronic devices presently available or as marketed in the future with suitable modifications. The aspect of the invention described below is the process of installing the security software onto a portable computer. The method of installation is crucial because the software must remain undetectable once installed. Furthermore, the software should be as difficult as possible to erase. In summary, the invention achieves these objects by installing the software in such a manner that it remains hidden to the operating system, such as MS-DOS.

Four alternative ways of installing the agent security system during the disk boot are illustrated in FIGS. 3A–3D respectively. The system can also be installed with MS.SYS or IBMDOS.COM, but these are more difficult and less preferred than the three alternatives set out below. The loading program TENDER (further described in the Appendix) can be used to install the agent by one or more of these alternative installation methods. Thus, the agent may be installed in a variety of locations whereby second and third agents can provide back up support for the primary agent. The four locations where the agent can be installed on the client device are as follows:

1. The operating system boot sector- See FIG. 3A.
2. A hidden system file such as IO.SYS for MS-DOS or IBMBIO.COM for PC-DOS-See FIG. 3B.
3. The partition boot sector- See FIG. 3C.
4. The ROM BIOS- See FIG. 3D Referring to FIG. 3A, the agent loading sequence is described for loading the agent on the operating system boot sector. The computer 10 is powered on and the loading sequence begins 64. As is well known in the art, the computer 10 performs an initial testing routine to assure that all components are working properly 65. Illustratively, the program incorporated is the IBM-PC compatible Power-On Self Test (POST) routine. The partition boot sector is loaded 66. Next the operating system boot sector with the installed agent is loaded 67. In an effort to maintain the transparency of the agent, the CPU registers (corresponding to the current state of the computer) are saved 68. Before the agent is installed there is a check for a Remote Procedure Load (RPL) signature 69. If the signature is present this indicates that the agent is already in memory and will not be loaded again. However, if there is no RPL signature then preparation is made to load the agent. First, space is reserved for the agent at the ceiling of conventional memory 70. Next, Interprocess Communication Interrupt (2Fh) is hooked 71 which enables communication with other programs. Interrupt Eah, which is the disc input/output handler, is hooked 72. The old timer interrupt is saved, and new hook timer interrupt is put into place 73. Now the CPU registers are restored 74 in order to maintain the transparency of the system. The original operating system boot sector is loaded 75. The original operating system had been moved to accommodate the agent installation. Finally, the operating system is loaded 76 and running 77 again.

Referring to FIG. 3B, the agent loading sequence is described 78–91 for loading the agent on a hidden system file such as IO.SYS for MS-DOS or IBMBIO.COM for PC-DOS. The sequence is analogous to that disclosed above for the operating system boot sector. However, instead of loading the agent with the operating system boot sector, the agent is loaded with the operating system file 82 (load modified IO.SYS or IBMBIO.COM).

Referring to FIG. 3C, the agent loading sequence is described 92–104 for loading the agent on the partition boot sector. The sequence is analogous to that disclosed above for the operating system boot sector. However, instead of loading the agent with the operating system boot sector, the agent is loaded with the operating system partition boot sector 94.

Referring to FIG. 3D , the agent loading sequence is described 105–116 for loading the agent via ROM BIOS. This schematic illustrates an embodiment of this invention on firmware. The sequence is analogous to that disclosed above for the operating boot sector. However, the agent is loaded from the ROM after the CPU registers are saved 107. At that time the ROM can take control of the system and load the agent. Once the CPU registers are restored 113, the ROM can no longer load the agent.

Host Identification and Filtering System

Figure 2B:
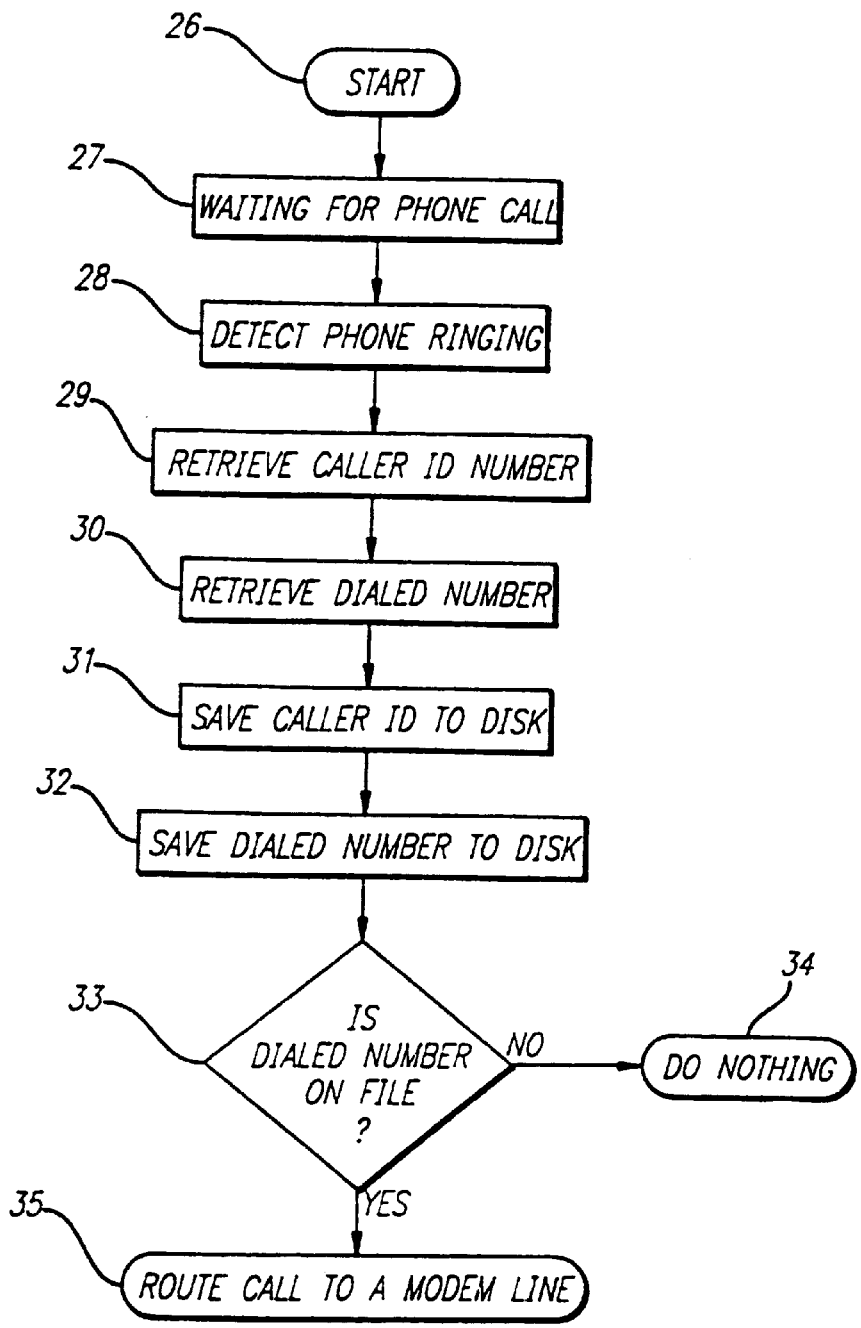
FIG. 2B is an illustrative embodiment in the form of a flowchart of a process by which the host identification and filtering subsystem identifies and filters out unwanted calls from agents.

The Host Identification and Filtering System identifies and filters out unwanted calls from agents. FIG. 2B is a flow diagram of the host identification and filtering program executed by host computer 3. Once the security program is executed 26, the voice board waits 27 for the ring signal on the telephone line 1. When a ring signal is detected 28, the voice board 2 acknowledges the incoming call by sending a signal to the telephone company 9B via telephone line 1 requesting that the caller ID and the dialed numbers be sent to it. The voice board then waits until these numbers are received 29, 30.

Once the caller ID and the dialed numbers have been received, they are saved to the hard disk 31, 32. The security program then compares the dialed numbers 33, which provide an encoded version of the serial number of the client computer 10 (coding scheme explained in detail below), against a list of serial numbers stored on the hard disk 4. If no match is found, the program lets the phone ring until the client computer 10 hangs up the telephone line 34. In the preferred embodiment, the client computer is programmed to hang up after 30 seconds of unanswered ringing. However, if a match is found, the security program routes the call to an appropriate receiving line connected to a modem 35, which answers the call. In an alternative embodiment, the host 3 answer all calls and the serial number of the client computer 10 is provided in a separate subsequent call from the client computer 10.

Encoding of the client computer serial number

Figure 4:
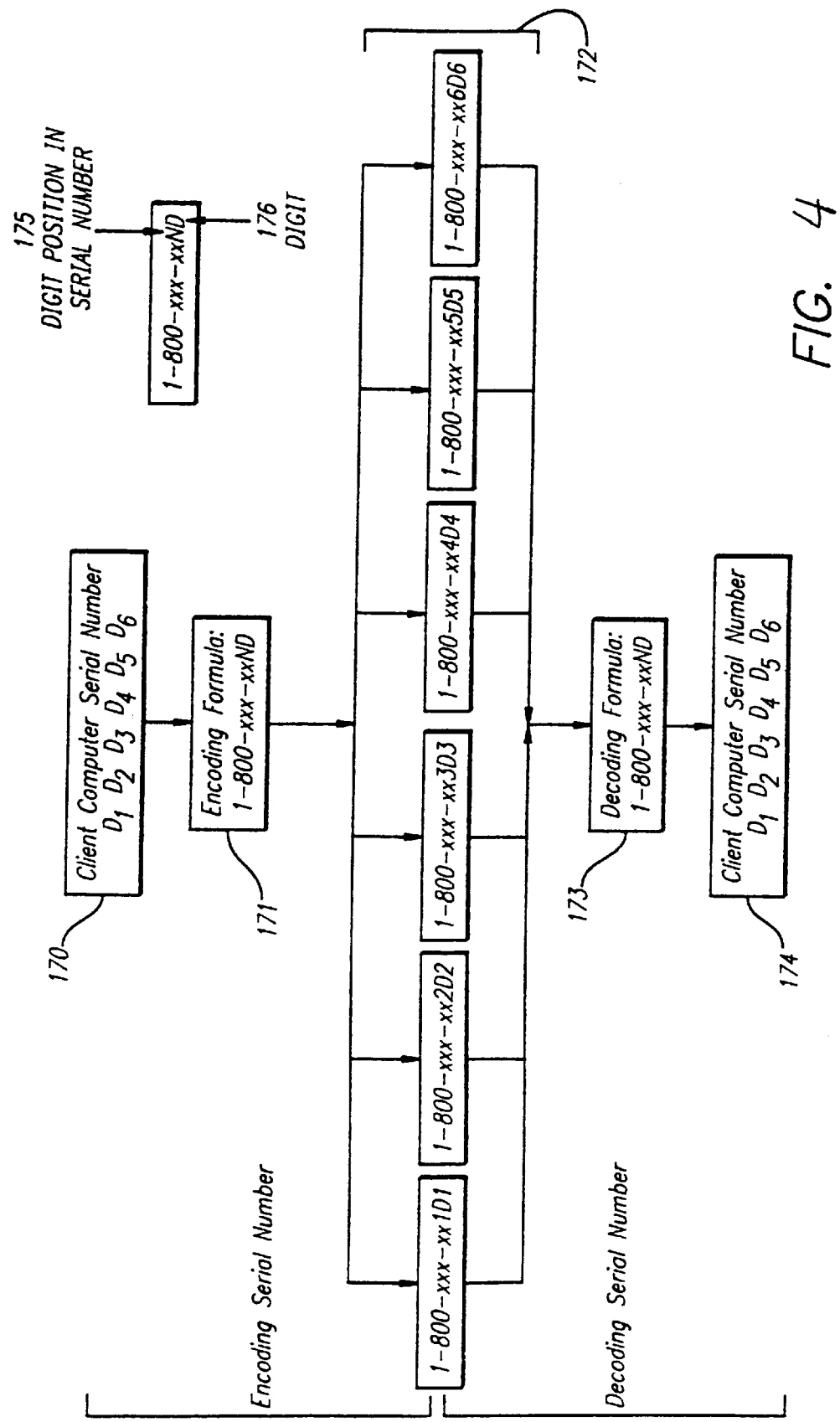
FIG. 4 is a schematic showing an illustrative embodiment of the encoding/decoding method whereby the monitoring service would have to subscribe to 60 telephone numbers.

Referring to FIG. 4 in one embodiment of the invention, the serial number of client computer 10 is encoded within the dialed numbers it sends to the host 3. In the preferred encoding methodology, the client computer transmits its six digit serial number 170 to the host via a series of six complete dialed phone numbers 172. The first eight dialed digits after the first "1" are meaningless. The ninth dialed digit "N" 175, indicates which digit position within the serial number that the tenth dialed number corresponds to. The tenth dialed digit "D" provides the Nth digit of the serial number. The host computer 3 receives the six complete dialed phone numbers 172 and decodes them 173 by looking at only the ninth and tenth dialed digits. The client computer serial number 174 is thus reproduced.

For example, in the sequence "800-996-5511", the only relevant digits are the "11" portion. The first "1" indicates that the digit immediate to its right (1) is the first digit in the serial number. Similarly, in the sequence "800-996-5526", the "2" indicates that the number immediate to its right (6) is the second number in the serial number. The client computer, in total, dials six numbers 172 in order to convey its six-digit serial number to the host.

In order to accommodate this method of serial number coding, the host monitoring system needs to subscribe to sixty different phone numbers. All sixty numbers should have the same first eight digits, and only vary from one another with respect to the last two digits. The ninth digit need only vary from "1" through "6" corresponding to the six digits within a serial code. However, the last digit must vary from "0" to "9".

Figure 4A:
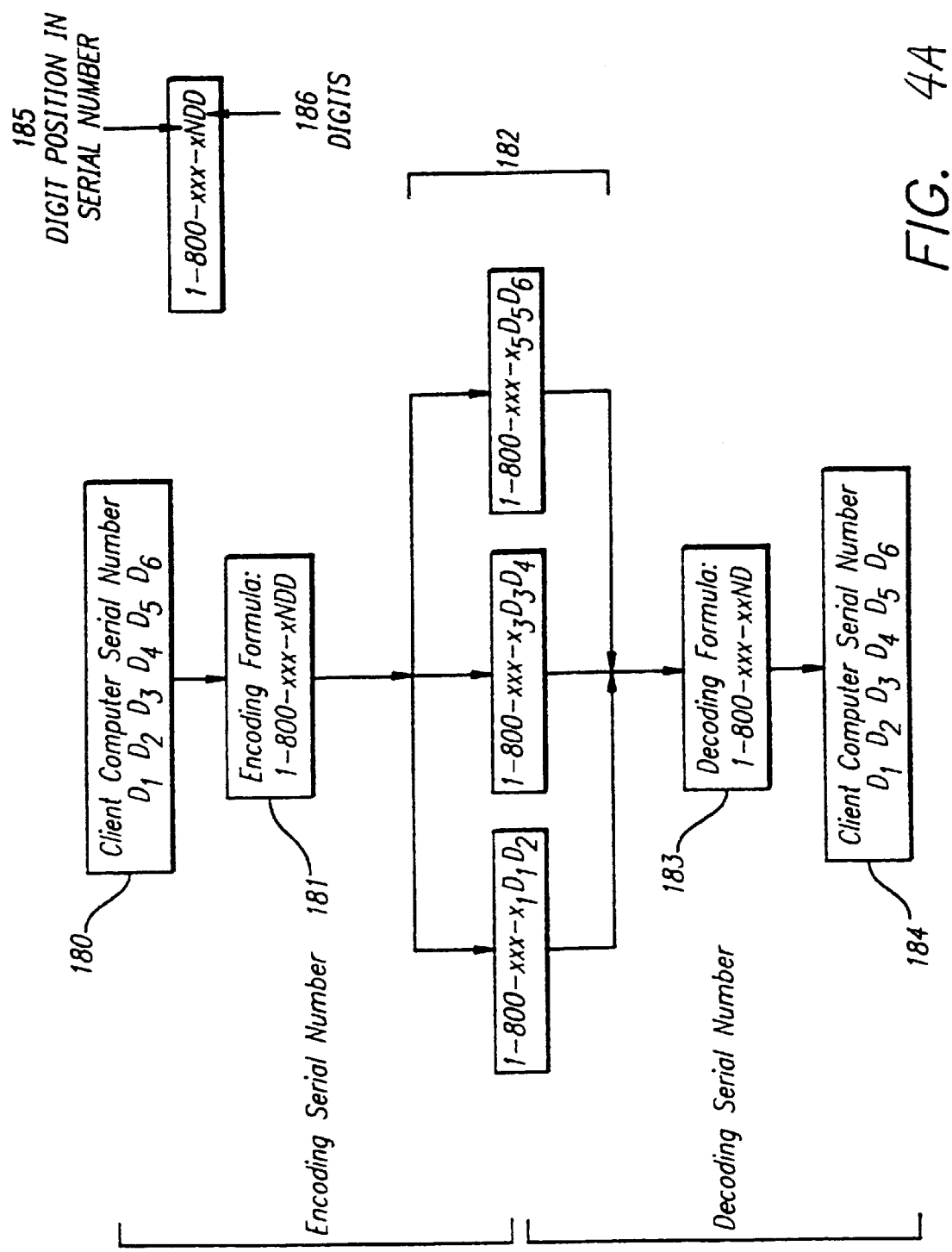
FIG. 4A is a schematic showing an illustrative embodiment of the encoding/decoding method whereby the monitoring service would have to subscribe to 300 telephone numbers.

Referring to FIG. 4A, the encoding methodology can alternatively be modified such that the client computer need only call the host three times to convey its serial number 180. According to this coding method, two digits of the serial number 186 would be transmitted in each call. Thus, the eighth dialed digit 185 would vary from "1" to "3", corresponding to the three packets of two digits 186 that make up the serial number 180. The ninth and tenth dialed digits 186 would vary from "0" through "9". However, this would require the operator of the monitoring system to subscribe to three hundred different phone numbers.

Host Processing, Auditing and Communication Subsystem

Figure 2C:
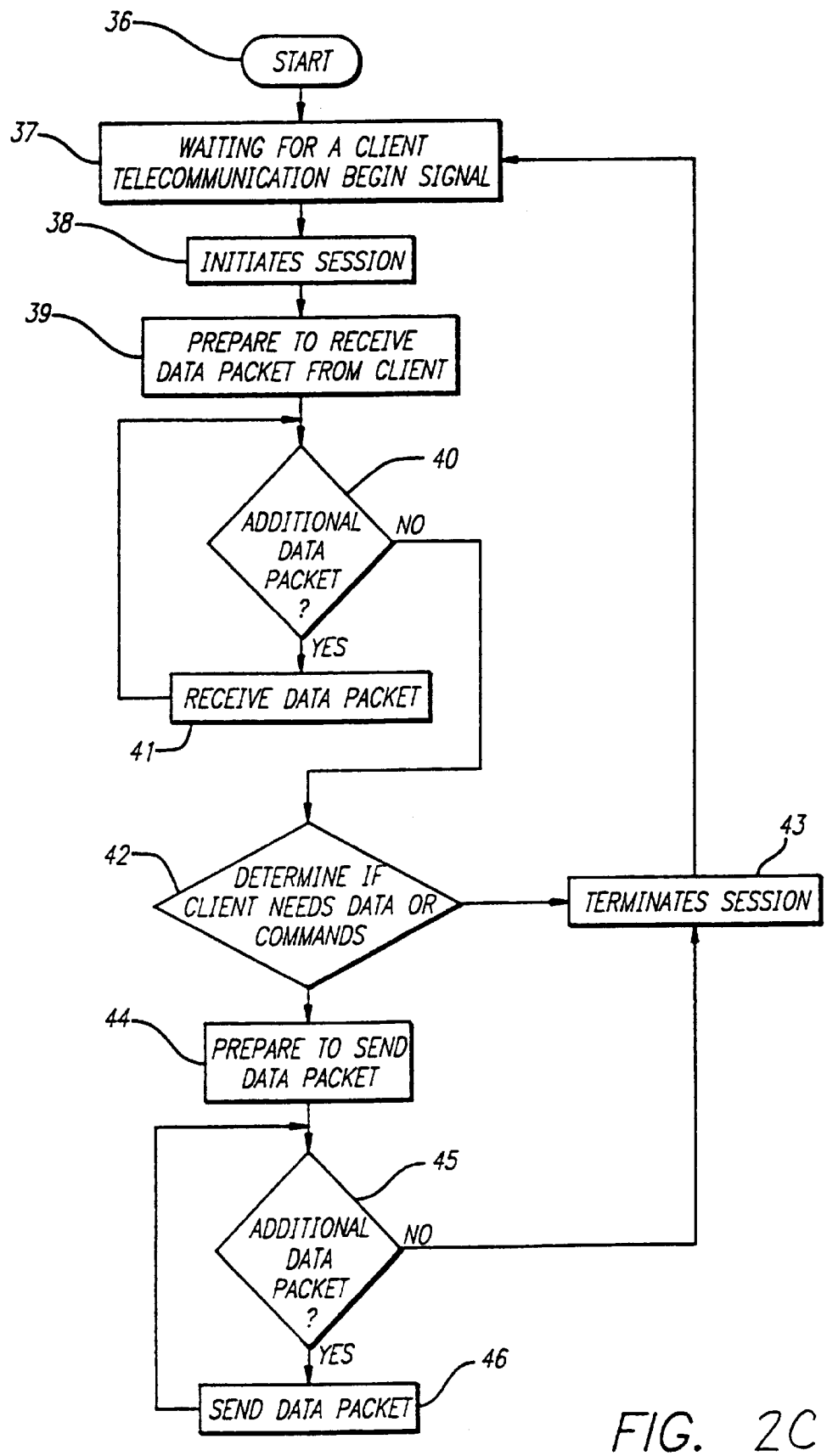
FIG. 2C is an illustrative embodiment in the form of a flowchart of a process by which the host telephone monitoring subsystem exchanges data with an agent.

The host processing, auditing and communication subsystem receives and transmits information to and from clients. FIG. 2C is a flow diagram of the host communication program executed by host computer 3. After the host computer 3 is powered on 36, communication equipment is instructed to wait 37 for the telecommunication begin signal from the client computer 10. The telecommunication equipment acknowledges the begin signal by initiating a session to communicate with the client computer 38 and preparing the host to receive data packets from the client 39. The program first establishes that the client computer is sending data packets and that it has received all of the packets 40, 41. Next, the program determines if the client has any data or commands to be sent to the host 42. If not, the session is terminated 43, and the cycle is repeated 37. When all data packets have been received, the program permits the host to send data packets to the client computer. The program prepares to send data packets 44, and then establishes that there are more data packets to be sent 45 before sending each packet 46. Once all data packets have been sent, the program terminates the session 43, hangs up the phone, and prepares to repeat the entire cycle 37. Host-side source codes are disclosed in the Appendix in Visual C++ (Microsoft) Code.

Referring to FIG. 2C1, the host processing, auditing and communication subsystem for the Internet application receives and transmits information to and from clients over the Internet. FIG. 2C1 is a flow diagram of the host communication program executed by host computer 3 in connection with the Internet application. After the host computer is powered on 36a, TCP/IP support is loaded and the computer waits for a DNS query from the client computer 36b. The host name is then extracted from the DNS query 36c. Next, the DNS request is decoded to determine the client computer identification 36d. A check is made to determine whether the computer has been stolen 36e. This is accomplished by comparing the identification number of the client computer with a list of reported lost or stolen computers which is stored by the host computer. If it has been stolen a suitable message 36f is returned to the client computer 10. In the preferred embodiment, the message is provided by setting the IP address of the next transmission to the client computer to "204.174.10.1" 36f. If the client computer is not stolen, an alternate message is returned 36g. In the preferred embodiment this is achieved by setting the IP address to "207.174.10.16" 36g. The host uses either of these two IP addresses to form a response to the DNS query received from the client computer 36h. The host then sends its response to the client computer 36i. The host also records the transaction on the hard disk. The host then prepares to repeat the entire cycle 36b.

Referring to FIG. 2C2, the manner in which client identification is encoded is illustrated. FIG. 2C2 shows the various components of a host name which is used to form a DNS request. The host name, according to one embodiment of the invention, is a string of characters including the date and time 37, encoded client identification 38, and domain name 39. The encoded client identification 38 is extracted from the host name for decoding at the host Internet subsystem 9y.

Host Notification Subsystem

Figure 2D:
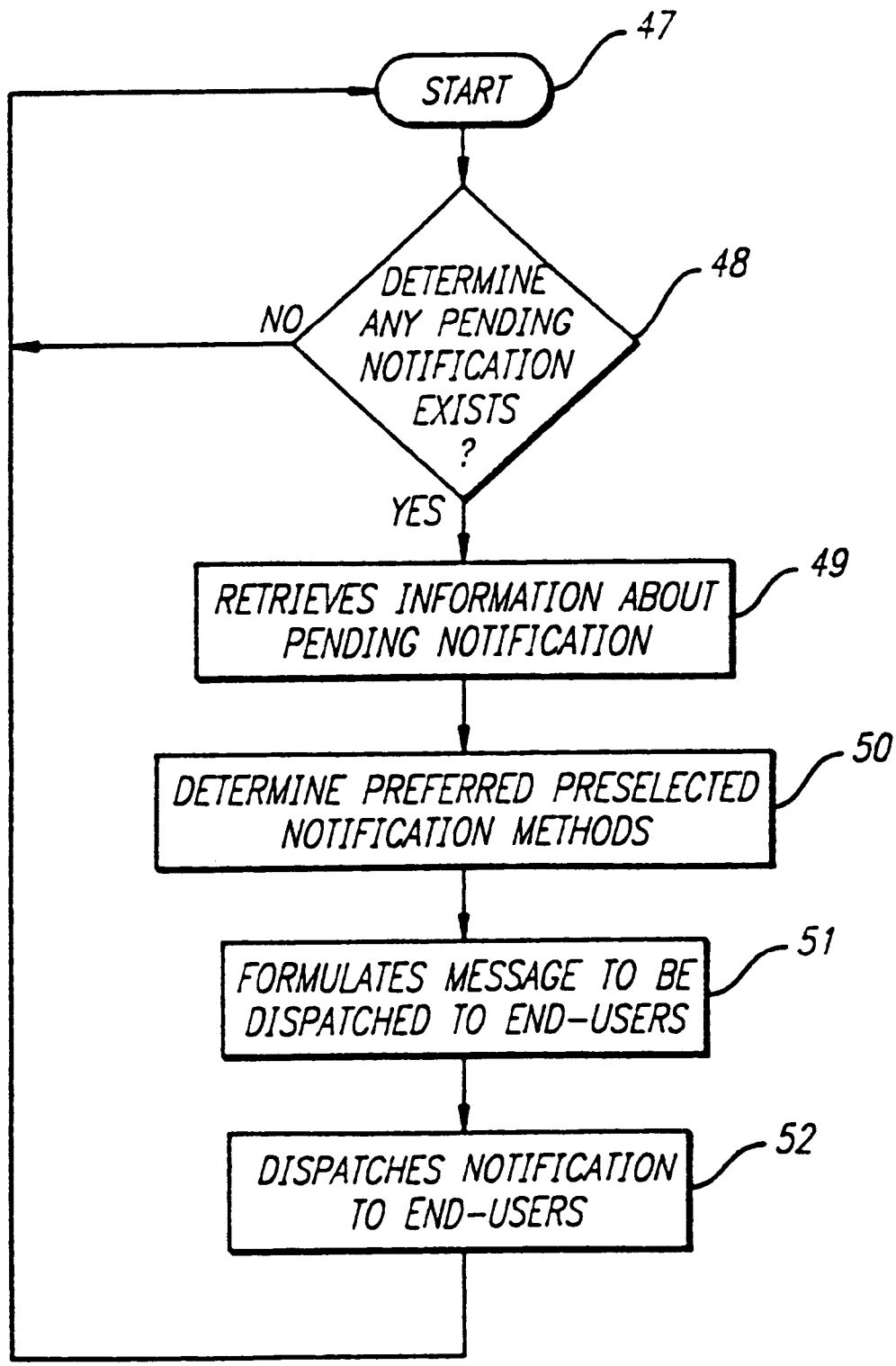
FIG. 2D is an illustrative embodiment in the form of a flowchart of the process by which the host notification subsystem, contained within the host computer, notifies end-users of the status of monitored devices.

The host notification subsystem notifies the end-users regarding the status of their electronic devices. In FIG. 1, various methods of notification such as; electronic mail N1, fax N2, paging N4, and telephone call N3, are depicted. FIG. 2D is a flow diagram of the host notification program executed by host computer 3. The host notification program determines whether there are any pending notification instructions or commands 48. If there are pending notifications, the information is retrieved 49. The program then determines the preferred preselected notification method 50, and formulates the message to be dispatched 51 according to the preselected notification method. This message is dispatched to the end-user 52. After dispatching the message, the program repeats the entire cycle 47. Host-side source codes are disclosed in the Appendix in Visual C++ (Microsoft) Code.

Variations and Alternatives

The above description relates to the agent security system installed and operating in a conventional PC with an Intel 80×86 microprocessor or equivalent and with a conventional MS-DOS or PC-DOS operating system. It will be recognized that the system can be modified to fit other types of computers including, for example, those sold under the trademark Macintosh. The system can easily be modified to suit other types of operating systems or computers as they develop.

The above system is also intended to be added to existing computers without physical alteration. Another approach is to modify the ROM of such computers to contain the agent security system as shown in FIG. 3D. The agent security system also may be incorporated into the ROM of portable computers, cellular telephones or other such items when they are manufactured. FIG. 3D above describes the loading of the system from such a modified ROM.

One embodiment of the invention uses a modem connected or built-in to a computer. In the future it is likely that telephone systems will be digitized, thus obviating the need for a modem. The scope of this invention is contemplates such digitized systems.

The system could also be included in the ROM of a cellular telephone. In this case, the program would hide the outgoing calls from the user by silencing audio signals and maintaining a normal screen display. It is also conceivable that portable computers can be supplied with integral cellular telephones modified in this manner or with some other telecommunication device.

The main telecommunication criteria for this agent security system is that the outgoing transmission (wire, radio signal or otherwise) be received by a switching mechanism, and contain information that causes the switching mechanism to forward the information received to a remote station. Presently, this information is a telephone number and/or a DNS query. But other indicia of the remote station may be substituted in alternative switchable communications systems without departing from the scope of this invention.

This application contemplates sending and receiving signals from a client computer to a host system through a global network system. The Internet has been described in this application as merely one application of the invention. It is contemplated that this invention can and will be applied to other global network systems. Thus, the specific disclosure addressed to the Internet should not be construed as a limitation as to the scope of the invention, but rather should be considered to be merely one embodiment of the invention.

CONVENTIONAL BOOT UP METHOD

Figure 3H:
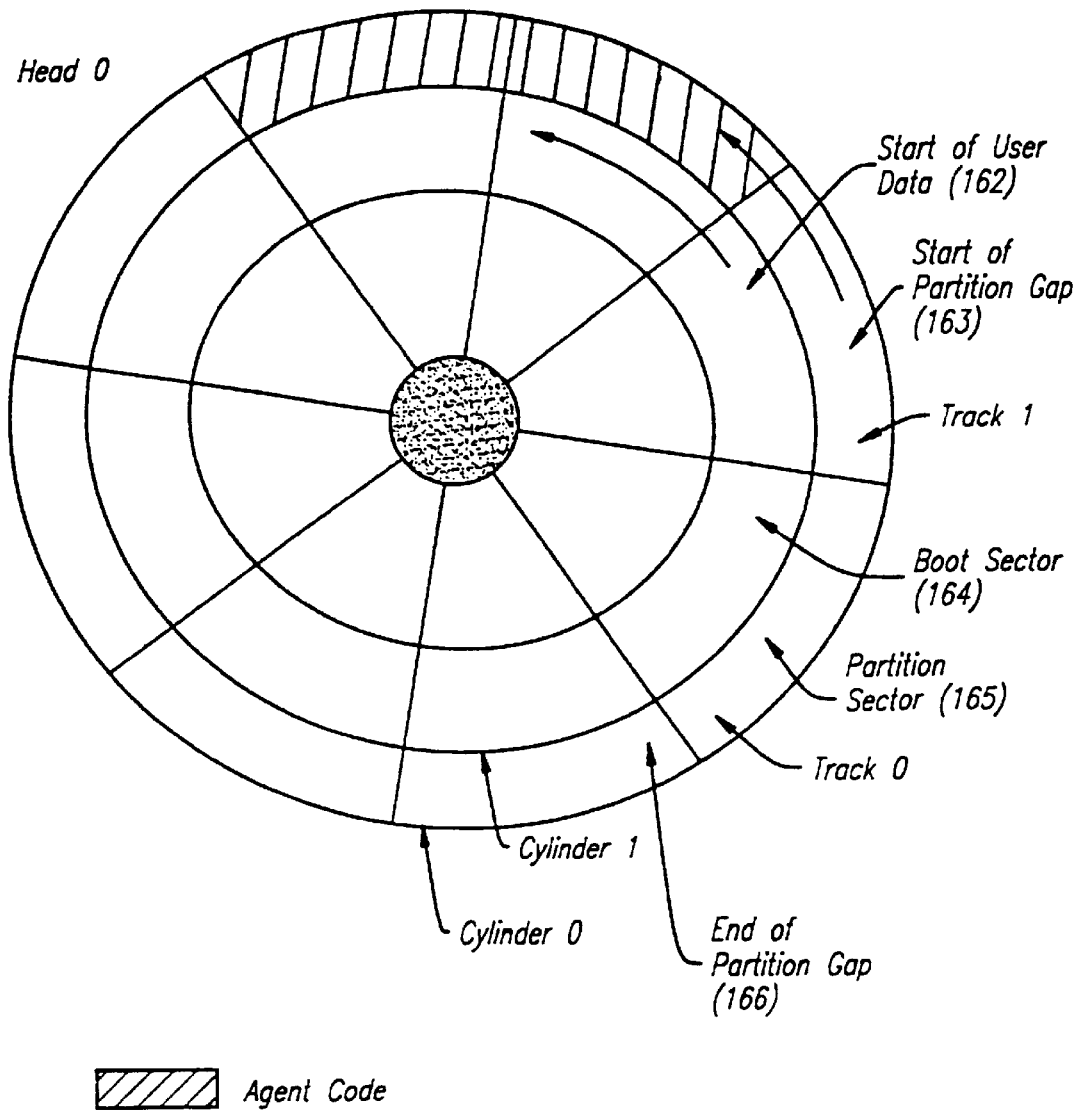
FIG. 3H is an isometric view, partly diagrammatic, of the physical structure of a computer disc.

Referring to FIG. 3H, an isometric view of a computer disc is shown. This figure illustrates the location of the start of user data 162, partition gap 163, boot sector 164, partition sector 165, and partition gap 166.

Referring to FIG. 3, upon hitting the on switch of a personal computer (PC) 53, the computer first goes through a conventional power-on self-test (POST) 54. At this point the agent could be loaded if ROM-BIOS loading is used 60. POST ensures that all hardware components are running and that the central processing unit (CPU) and memory are functioning properly. Upon completion of the POST, the next task is to load software onto the random access memory (RAM) of the computer. Conventionally, there is a read-only memory (ROM) device which contains a boot program. The boot program searches specific locations on the hard disk, diskette or floppy disk for files which make up the operating system. A typical disk is shown in FIG. 3H. Once these files are found, the boot program on the ROM reads the data stored on the applicable portions of the disk and copies that data to specific locations in RAM. The first portion of the disk boot sector to be loaded is the partition boot sector 55 shown in FIG. 3H as 165. At this point the load partition boot sector method could be used 61. The partition boot sector 165 then loads the remaining boot sector 164 from the disk, namely the operating system boot sector 56. Now the agent could be loaded according to the load operating system boot sector method 62. The operating system boot sector 164 loads into memory a system file, normally named IO.SYS on personal computers or IBMBIO.COM on IBM computers 57. Now the agent could be loaded according to the IO.SYS or IBMMIO.COM methods. Each of these files is marked with a special file attribute that hides it from the DOS Dir. The IO.SYS or equivalent then loads the rest of the operating system, conventionally called MSDOS.SYS on MS-DOS systems, and IBMDOS.COM for PC-DOS systems. Next the AUTOEXEC.BAT is processed and run 58. Now the operating system is running 59. The agent security system according to the invention is loaded during the boot up process and accordingly is transparent to the operating system.

DETAILS OF AGENT INSTALLATION

Once the TENDER program, which enables the agent to be installed, has been run and the agent has been determined to be loaded via one or more of these alternatives, the system is primed and proceeds to attempt to install the agent security system according to the present state of the computer memory and the instructions given by the programmer. The SNTLINIT routine initializes the agent security system and is passed one of the possible loading options via the AX microprocessor register by the calling program (SUBLOADR), which itself was loaded on any one of the enumerated locations described above. The SUBLOADR program reads the configuration file (which may be encrypted) that was generated for user input. The validity of the configuration file is checked at this point to see if it is corrupted or not. If for some reason it cannot read the configuration file, it initializes the agent security system from a table of default settings.

The SUBLOADR program then checks to see if the agent security system is in memory by looking for the "RPL" signature. SUBLOADR saves the application programmer interface (API) entry point and then determines which version of the security program, if any, is in memory. If not in memory, the SUBLOADR program searches the disk for the SNTLINIT routine. Depending upon the version of the SUBLOADR program, it may perform a validity check on the SNTLINIT routine. This routine may be a cyclical redundancy check (CRC) of 16 or 32 bits, a checksum check or a hash count.

The TENDER program checks the partition boot sector, the operating system boot sector, and the IO.SYS (or IBM- BIO.COM on PC-DOS systems) to see if any of them have been modified to contain the SNTLINIT code. A comparison to the configuration file is made to determine if the agent has already been installed in any of the alternative locations. If the agent has already been installed, the TENDER program takes no action. It then tracks the level of modification that was requested by the user (i.e. whether one, two or three areas were to be modified). Each of these areas has all the modem related information written to it amongst other user selected settings. At this point it writes the current configuration file to disk.

The TENDER program then takes a system snapshot of the partition boot sector, the operating system boot sector and the IO.SYS or IBMBIO.COM file, validating them, determines and then writes this file to disk. It then checks the partition gap between the partitions, calculating the number of unused sectors between the valid boot sectors (be they partition or operating system boot sectors).

There is almost certainly at least 8 K of space in the partition gap 163. The agent security system requires only 4K. The SNTLINIT module is usually stored here. If for some reason there is not enough space in the partition gap, or if the data area is physically unusable, the TENDER program will pick a suitable cluster of sectors, mark the data area logically as being unusable, then store SNTLINIT in the cluster of sectors. The TENDER program sets out the attributes to system, hidden etc in order to hide the program image. It then calculates the physical coordinates of the cluster that was used and writes this information to the configuration file. At this point the system is ready to proceed and will be loaded prior to the completion of the loading of the operating system regardless of what strategy the programmer has chosen.

In a manner similar to how viruses reinfect the boot sector 164 of the hard disk drive, the agent security system according to the invention uses such technology to help protect against theft of the computer. Other technologies such as system timer programming and communications programming are bound to this virus like technology to create a new technology. It should also be understood that a security company which handles incoming calls from clients may readily redefine the time period between successive calls from a client to its host.

Since MS-DOS and PC-DOS were designed to be single-user, single-tasking operating systems, the timer interrupt is used to run the system unattended and automatically in the background to provide multi-tasking. Neither the user nor a potential thief would notice this background process although registered owners will be aware of its existence.

In a standard personal computer, routine housekeeping tasks are performed periodically and automatically by the CPU without instructions from the user. There is a timer routine which is called 18.2 times per second to perform such tasks as turning off the floppy disk motor after a certain period of inactivity. The agent security system hooks into this timer routine. The total timer routine takes about 55 milliseconds and the agent security system utilizes a small portion of CPU time during that period; this is limited to less than 0.5% of the total timer routine. This is not sufficient time to run the entire security program. Accordingly, the security program is run in small increments with each timer routine. It is important that the security program not "steal" enough computer time to be noticed. Otherwise the computer would be noticeably slowed and the existence of the program might be suspected.

Serial port and modem setup routines must be called by the timer interrupt. Once this is done, the serial interrupt handler that is being used will handle the details of data transfer between the client and host systems. Once the system is set up, the serial port interrupt handler does most of the work with the timer interrupt acting as a monitor watching the transaction when it happens between the client and the server. It analyzes the receive buffer and takes the appropriate actions as necessary. The communication portion of the system can handle outgoing and incoming data transfers on its own since it has its own access to the CPU via its own interrupt request (IRQ) line, typically IRQ3 or IRQ4. Therefore the system can handle the data flow between the client machine and the server unattended.

At the start of its time-slice, the timer interrupt checks the flag, which is set when a user uses the modem, in the agent security system, the InComISR flag byte (In Communications Interrupt Service Routine). If the flag is set, the timer interrupt exits immediately so as not to interfere with the progress of any serial communications that may be occurring, therefore not disrupting any transaction in progress. If the flag is not set, the timer interrupt routine will check to see if the agent security system is in an error state. If not in error, a flag called TimerISR count is set to indicate that a timer interrupt is in progress.

A deferred execution function pointer is used to point to the upcoming routine to be executed. Just before the timer interrupt routine finishes, it points to the next routine to be executed. When the next timer interrupt occurs the routine that was pointed to will be executed. The routine must complete in less than 55 milliseconds so that the next timer interrupt does not occur while the routine is still executing.

Attached to the PC's system bus are communications ports, all of which are optional and typically called COM1, COM2, COM3, COM4 for the first four ports. It is unusual to have more than four serial ports in a PC that is using only MS-DOS or PC-DOS as its operating system. The agent security system also requires that a modem be connected to one of these serial ports so that calls can be made to a remote host server using normal telephone lines or dedicated telecommunications lines. When alerted 118, the agent security system needs to be able to find an available serial port 119–122, once it does so it checks to see if a modem is attached 128–129 and tries to initialize it by sending it an initialization string 132. If successful, it checks for a dialtone, then tries to make a quiet call to a remote host server 141. Once the server has been connected, the client machine attempts to initiate a data transaction with the server so it can send its serial number and other data defined to be part of the transaction 151. The server is configured to connect at 2400 bps with no parity, 8 data bits and 1 stop bit. Thus the client matches this configuration. This allows a high connection reliability.

It will be understood by someone skilled in the art that many of the details described above are by way of example only and are not intended to limit the scope of the invention which is to be interpreted with reference to the claims which follow.

HOST AND CLIENT-SIDE SOURCE CODES

The microfiche appendix is a compilation of source code pertaining to:

(1) one embodiment of a version of the agent which is operable in the Microsoft Windows NT environment ("ctmnt" files);

(2) one embodiment of a version of the the monitoring server which are operable in the Microsoft Windows NT environment ("ctserver" files);

(3) one embodiment of a version of the agent which is operable in the DOS environment ("sentinel" files);

(4) the Subloader component of the agent according to one embodiment of the invention ("subloadr" files);

(5) one embodiment of a version of the agent which is operable in the Microsoft Windows environment ("vxd" files); and (6) one embodiment of a version of the agent and monitoring server which are operable over the internet ("internet" files).

We claim:

1. A method for tracing an electronic device having an agent, said agent used for providing identifying indicia and location information for said electronic device to a host system, said electronic device connectable to said host system through a global network, said method comprising the steps of:

loading said agent within said electronic device for initiating communication with said host system such that said agent evades detection;

automatically providing said host system with said identifying indicia through said global network for determining the identity of said electronic device; and providing said host system with one or more of the global network communication links used to enable transmission between said electronic device and said host system, said communication links used for determining the location of said electronic device.

2. The method of claim 1 wherein said global network is the Internet.

3. The method of claim 1 wherein said electronic device is further connected to said host system through a telephone network, and said method further includes the steps of providing said identifying indicia to said host system through said telephone network, and determining the location of said electronic device by tracing the source of said identifying indicia within said telephone network.

4. The method of claim 1 wherein said electronic device is further connected to said host system through a cablevision network, and said method further includes the steps of providing said identifying indicia to said host system through said cablevision network, and determining the location of said electronic device by tracing the source of said identifying indicia within said cablevision network.

5. The method of claim 1 wherein said electronic device is further connected to said host system through a wireless radio frequency network, and said method further includes the steps of providing said identifying indicia to said host system through said wireless radio frequency network, and determining the location of said electronic device by tracing the source of said identifying indicia within said wireless radio frequency network.

6. The method of claim 1 wherein said electronic device is further connected to said host system through a wireless microwave network, and said method further includes the steps of providing said identifying indicia to said host system through said wireless microwave network, and determining the location of said electronic device by tracing the source of said identifying indicia within said wireless microwave network.

7. The method of claim 3 wherein said step of providing said host system with said identifying indicia through said global network, and said step of providing said identifying indicia to said host system through said telephone network occur at predetermined intervals.

8. The method of claim 7 wherein said electronic device is lost or stolen and said method further including the step of tracing lost or stolen electronic devices.

9. The method of claim 2 wherein said step of providing said host system with said one or more of the Internet communication links is accomplished using a traceroute routine.

10. The method of claim 1 wherein said step of providing said host system with said identifying indicia is accomplished by sending a data packet including address information relating to the source of the global network transmission.

11. The method of claim 2 wherein said step of providing said host system with said identifying indicia is accomplished by sending a domain name service query with said identifying indicia encoded therein.

12. The method of claim 2 further including the step of providing a list of lost or stolen electronic devices to said host system and comparing said list of lost or stolen electronic devices with said identifying indicia to determine if said electronic device is lost or stolen.

13. The method of claim 12 wherein said host system sends a signal through said Internet to said electronic device if it is determined to be lost or stolen indicating that said lost or stolen electronic device should initiate a traceroute routine.

14. The method of claim 12 wherein said host system sends a signal through said Internet to said electronic device if it has been determined to be lost or stolen indicating that said electronic device should initiate a call to said host system via said telephone network.

15. The method of claim 11 wherein said identifying indicia is encoded within said domain name service query according to a predetermined scheme.

16. The method of claim 15 wherein said host system decodes said identifying indicia to determine the identity of said electronic device.

17. The method of claim 1 wherein said electronic device is a computer having a hard drive.

18. The method of claim 17 further including the step of providing said agent with deflection means to enable said agent to resist disablement attempts and evade detection.

19. The method of claim 18 wherein said deflection means deflects read and write attempts to the location where said agent is disposed.

20. The method of claim 1 wherein said step of evading detection is accomplished by providing an agent which is operable without interfering with the normal operation of said electronic device.

21. The method of claim 17 wherein said step of loading said agent within said computer is accomplished by loading said agent within the boot sector of said hard drive.

22. The method of claim 17 wherein said step of loading said agent within said computer is accomplished by loading said agent within the partition sector of said hard drive.

23. The method of claim 17 wherein said step of loading said agent within said computer is accomplished by loading said agent within an operating system file on said hard drive.

24. The method of claim 23 wherein said operating system is MS-DOS and said operating system file is IO.SYS.

25. The method of claim 23 wherein said operating system is PC-DOS and said operating system file is IBM-BIO.COM.

26. The method of claim 17 wherein said step of loading said agent within said computer is accomplished by loading said agent on the ROM BIOS.

27. The method of claim 17 wherein said agent is a terminated and stay resident program.

28. The method of claim 17 wherein said agent is a virtual device driver program.

29. The method of claim 17 wherein said agent is an application program.

30. The method of claim 17 wherein said agent is a file filter program.

31. The method of claim 1 wherein said agent provides said identifying indicia automatically and without user intervention.

32. The method of claim 31 wherein said step of providing said host system with said identifying indicia occurs without causing audible or visible signals to be emitted from said electronic device.

33. The method of claim 2 wherein the communication link between said electronic device and said host system is provided through a link to a private network connection to the Internet.

34. The method of claim 2 wherein the communication link between said electronic device and said host system is provided through a telephone line connected to an Internet provider.

35. The method of claim 1 further including the step of assigning said identifying indicia to said agent wherein said identifying indicia comprises a unique electronic serial number, said electronic serial number for enabling the determination of the identity of said electronic device associated with said agent.

36. A method for monitoring an electronic device connectable to a host system through a global network, said electronic device having an agent, said agent providing identifying indicia for determining the identity of said electronic device, said method comprising the steps of:

loading said agent within said device such that said agent evades detection; and automatically providing said host system with said identifying indicia through said network without causing audible or visual signals to be emitted from said electronic device.

37. The method of claim 36 wherein said electronic device is further connected to said host system through a telephone network, and said method further includes the step of providing said identifying indicia to said host system through said telephone network.

38. The method of claim 36 wherein said step of providing said identifying indicia occurs automatically and without human intervention.

39. The method of claim 37 wherein said step of providing said host system with said identifying indicia through said global network, and said step of providing said identifying indicia to said host system through said telephone network occur at predetermined intervals.

40. The method of claim 36 wherein said global network is the Internet and said step of providing said identifying indicia is accomplished by encoding a domain name service query to include said identifying indicia.

41. An apparatus for tracing an electronic device connectable to a host system through a global network, said electronic device having an agent, said agent providing identifying indicia and location information for said electronic device to said host system, said apparatus comprising:

means for loading said agent within said electronic device such that said agent evades detection;

means for automatically providing said host system with said identifying indicia through said global network; and means for providing said host system with one or more of the global network communication links used to enable transmission between said electronic device and said host system, said communication links used for determining the location of said electronic device.

42. The apparatus of claim 41 wherein said global network is the Internet.

43. The apparatus of claim 41 wherein said electronic device is further connected to said host system through a telephone network, and said apparatus further includes means for providing said identifying indicia to said host system through said telephone network, and means for determining the location of said electronic device by tracing the source of said identifying indicia within said telephone network.

44. The apparatus of claim 41 wherein said electronic device is further connected to said host system through a cablevision network, and said apparatus further includes means for providing said identifying indicia to said host system through said cablevision network, and means for determining the location of said electronic device by tracing the source of said identifying indicia within said cablevision network.

45. The apparatus of claim 41 wherein said electronic device is further connected to said host system through a wireless radio frequency network, and said apparatus further includes means for providing said identifying indicia to said host system through said wireless radio frequency network, and means for determining the location of said electronic device by tracing the source of said identifying indicia within said wireless radio frequency network.

46. The apparatus of claim 41 wherein said electronic device is further connected to said host system through a wireless microwave network, and said apparatus further includes means for providing said identifying indicia to said host system through said wireless microwave network, and means for determining the location of said electronic device by tracing the source of said identifying indicia within said wireless microwave network.

47. The apparatus of claim 43 wherein said means for providing said host system with said identifying indicia through said global network, and said means for providing said identifying indicia to said host system through said telephone network operate at predetermined intervals.

48. The apparatus of claim 43 wherein said electronic device is lost or stolen.

49. The apparatus of claim 42 wherein said identifying indicia is encoded within a domain name service query.

50. The apparatus of claim 42 wherein said means for providing said host system with said one or more global network communication links is accomplished using a traceroute routine.

51. The apparatus of claim 43 further including means for providing a list of lost or stolen electronic devices to said host system and means for comparing said list of lost or stolen electronic devices with said identifying indicia to determine if said electronic device is lost or stolen.

52. The apparatus of claim 51 wherein said host system includes means for sending a signal through the Internet to said electronic device if it is determined to be lost or stolen, indicating that said lost or stolen electronic device should initiate said traceroute routine.

53. The apparatus of claim 51 wherein said host system includes means for sending a signal through the Internet to said electronic device if it is determined to be lost or stolen indicating that said lost or stolen electronic device should initiate a call to said host system through said telephone network.

54. The apparatus of claim 49 wherein said host system includes means for decoding said identifying indicia to determine the identity of said electronic device.

55. The apparatus of claim 41 wherein said electronic device is a computer having a hard drive.

56. The apparatus of claim 41 wherein said agent evades detection by operating without interfering with the normal operation of said electronic device.

57. The apparatus of claim 42 wherein said agent is provided with deflection means for evading detection and resisting disablement.

58. The apparatus of claim 57 wherein said deflection means deflect read and write attempts to the location on said hard drive where said agent is disposed.

59. The apparatus of claim 41 wherein said means for providing said host system with said identifying indicia operates automatically and without user intervention.

60. The apparatus of claim 59 wherein said means for providing said host system with said identifying indicia for said electronic device occurs without causing audible or visible signals to be emitted from said electronic device.

61. The apparatus of claim 42 wherein said Internet connection between said electronic device and said host system is provided through a link to a private network connection to the Internet.

62. The apparatus of claim 61 wherein said link to a private network connection to the Internet is a wireless link.

63. The apparatus of claim 42 wherein said Internet connection between said electronic device and said host system is provided through a telephone line connected to an Internet provider.

64. The apparatus of claim 42 further including means for assigning said identifying indicia to said agent wherein said identifying indicia comprises a unique electronic serial number, said electronic serial number for enabling the determination of the identity of said electronic device associated with said agent.

65. An apparatus for monitoring an electronic device connectable to a host system through a global network, said electronic device having an agent for providing identifying indicia for said electronic device to determine the identity of said electronic device, said apparatus comprising:

means for loading said agent within said electronic device such that said agent evades detection; and means for automatically providing said host system with said identifying indicia through said global network without causing audible or visual signals to be emitted from said electronic device.

66. The apparatus of claim 65 wherein said global network is the Internet.

67. The apparatus of claim 65 wherein said electronic device is further connected to said host system through a telephone network, and said apparatus further includes means for providing said identifying indicia to said host system through said telephone network.

68. The apparatus of claim 67 wherein said means for providing said host system with said identifying indicia through said global network connection, and said means for providing said identifying indicia to said host system through said telephone network operate at predetermined intervals.

69. The apparatus of claim 65 further comprising means for providing said host system with one or more of the global network communication links used to enable transmission between said host system and said electronic device, said communication links used for determining the location of said electronic device.

70. The apparatus of claim 65 wherein said agent evades detection by operating without interfering with the normal operation of said electronic device.

71. The apparatus of claim 70 wherein the agent evades detection and resists disablement by incorporating deflection means.

72. A method for tracing an electronic device having an agent, said agent used for providing identifying indicia and location information to a host system, said electronic device connectable to said host system through the Internet, said method comprising the steps of:

providing said host system with said identifying indicia through said Internet for determining the identity of said electronic device; and providing said host system with one or more of the Internet communication links used to enable transmission between said electronic device and said host system, said communication links used for determining the location of said electronic device.

73. An apparatus for tracing an electronic device connectable to a host system through the Internet, said electronic device having an agent, said agent providing identifying indicia and location information for said electronic device to said host system, said apparatus comprising:

means for providing said host system with said identifying indicia through said Internet; and means for providing said host system with one or more of the Internet communication links used to enable transmission between said electronic device and said host system, said communication links used for determining the location of said electronic device.

74. An agent for use in an electronic device, said electronic device connectable to a telecommunications interface connected to a telecommunications system, a remote host system also connected to said telecommunications system, said agent comprising:

means for periodically initiating and communicating with said host system without human intervention; and means for preparing said electronic device to transmit unique location information to said host system.

75. The agent of claim 74 wherein said location information consists of one or more of the Internet communication links used to enable transmission between said electronic device and said host system.

* * * * *